US011284114B2

(12) United States Patent
Hu et al.

(10) Patent No.: US 11,284,114 B2
(45) Date of Patent: Mar. 22, 2022

(54) ADAPTIVE LOOP FILTER SET INDEX SIGNALING

(71) Applicant: QUALCOMM Incorporated, San Diego, CA (US)

(72) Inventors: Nan Hu, San Diego, CA (US); Vadim Seregin, San Diego, CA (US); Marta Karczewicz, San Diego, CA (US); Muhammed Zeyd Coban, Carlsbad, CA (US)

(73) Assignee: Qualcomm Incorporated, San Diego, CA (US)

( * ) Notice: Subject to any disclaimer, the term of this patent is extended or adjusted under 35 U.S.C. 154(b) by 46 days.

(21) Appl. No.: 16/853,232

(22) Filed: Apr. 20, 2020

(65) Prior Publication Data

US 2020/0344494 A1   Oct. 29, 2020

Related U.S. Application Data

(60) Provisional application No. 62/837,640, filed on Apr. 23, 2019.

(51) Int. Cl.
*H04N 19/80* (2014.01)
*H04N 19/96* (2014.01)
*H04N 19/70* (2014.01)

(52) U.S. Cl.
CPC ........... *H04N 19/80* (2014.11); *H04N 19/70* (2014.11); *H04N 19/96* (2014.11)

(58) Field of Classification Search
CPC .... H04N 19/117; H04N 19/176; H04N 19/70; H04N 19/174; H04N 19/82; H04N 19/80
See application file for complete search history.

(56) References Cited

U.S. PATENT DOCUMENTS

2014/0294067 A1 * 10/2014 Li ................... H04N 19/174
                                                            375/240.02
2016/0234492 A1 * 8/2016 Li ..................... H04N 19/82
(Continued)

FOREIGN PATENT DOCUMENTS

WO   WO-2020126411 A1 * 6/2020 ............. H04N 19/70

OTHER PUBLICATIONS

Zhao L., et al., "CE3-related: MPM Based multi-line Intra Prediction Scheme", Joint Video Expert Team (JVET) of ITU-T SG 16 WP 3 and ISO/IEC JTC 1/SC 29/WG 11, Document: JVET-K0482-r1, 11th Meeting: Ljubljana, SI, Jul. 10-18, 2018, pp. 1-3.
(Continued)

*Primary Examiner* — Robert J Hance
(74) *Attorney, Agent, or Firm* — Shumaker & Sieffert, P.A.

(57) ABSTRACT

Examples for performing adaptive loop filtering in video coding are described. A video decoder may determine that a number of parameter sets, which each include one or more adaptive filters for adaptive loop filtering, that a current coding structure of the video data refers to for adaptive loop filtering is equal to zero. Based on the number of the parameter sets that the current coding structure refers to for adaptive loop filtering being equal to zero, the video decoder may determine which fixed filter from a set of fixed filters to use for adaptive loop filtering without receiving a syntax element that indicates whether one of the set of fixed filters is to be used for adaptive loop filtering. The video decoder may perform adaptive loop filtering on the current block based on the fixed filter from the set of fixed filters.

37 Claims, 6 Drawing Sheets

(56) References Cited

U.S. PATENT DOCUMENTS

| | | | |
|---|---|---|---|
| 2017/0238020 A1* | 8/2017 | Karczewicz | H04N 19/14 375/240.29 |
| 2019/0373258 A1 | 12/2019 | Karczewicz et al. | |
| 2020/0204800 A1 | 6/2020 | Hu et al. | |
| 2020/0329239 A1* | 10/2020 | Hsiao | H04N 19/117 |

OTHER PUBLICATIONS

U.S. Appl. No. 16/811,913, filed Mar. 6, 2020, 52 Pages, by Nan Hu et al., [Qualcomm, Inc.].

U.S. Appl. No. 16/822,990, filed Mar. 18, 2020, 64 Pages, by Nan Hu et al., [Qualcomm, Inc.].

Bossen F., et al., "JVET Common Test Conditions and Software Reference Configurations for SDR video", Joint Video Experts Team (JVET) of ITU-T SG 16 WP 3 and ISO/IEC JTC 1/SC 29/WG 11, Document: JVET-M1010-V1, 13th Meeting: Marrakech, MA, Jan. 9-18, 2019, pp. 1-6.

Hu N., et al., "CE2.3 and CE2.4: Fixed filters, Temporal filters, CU-level control and low-latency encoder for ALF", Joint Video Experts Team (JVET) of ITU-T SG 16 WP 3 and ISO/IEC JTC 1/SC 29/WG 11, Document: JVET-L0391, 12th Meeting: Macao, CN, Oct. 3-12, 2018, pp. 1-17.

Hu N., et al., "Coding Tree Block based Adaptive Loop Filter", Joint Video Experts Team (JVET) of ITU-T SG 16 WP 3 and ISO/IEC JTC 1/SC 29/WG 11, JVET-M0429, 13th Meeting: Marrakech, MA, Jan. 9-18, 2019, pp. 1-12.

JVET: "VTM-4.0, Tags, JVET/VVCSoftware_VTM, GitLab", Frank Bossen, https://vcgit.hhi.fraunhofer.de/jvet/VVCSoftware_VTM/-/tags/VTM-4.0, pp. 1-2.

Bross B., et al., "Versatile Video Coding (Draft 5)", 14. JVET Meeting, Mar. 19, 2019-Mar. 27, 2019, Geneva, (The Joint Video Exploration Team of ISO/IEC JTC1/SC29/WG11 and ITU-T SG.16), No. JVET-N1001, May 10, 2019 (May 10, 2019), XP030205189, 370 pages, Retrieved from the Internet: URL: http://phenix.int-evry.fr/jvet/doc_end_user/documents/14_Geneva/wg11/JVET-N1001-v4.zip JVET-N1001-v4.docx, [retrieved on May 10, 2019], Section 7.4.8.2, Coding tree unit, semantics, p. 100-p. 101, Section 7.3.7.2, p. 49.

International Search Report and Written Opinion—PCT/US2020/029121—ISAEPO—dated Jul. 16, 2020 (15 pp).

ITU-T H.265, Series H: Audiovisual and Multimedia Systems, Infrastructure of Audiovisual Services—Coding of Moving Video, High Efficiency Video Coding, The International Telecommunication Union, Jun. 2019, 696 Pages.

Bross B., et al., "Versatile Video Coding (Draft 5)", Joint Video Experts Team (JVET) of ITU-T SG 16 WP 3 and ISO/IEC JTC 1/SC 29/WG 11, JVET-N1001-v2, 14th Meeting: Geneva, CH, Mar. 19-27, 2019, 364 pages.

Bross B., et al., "Versatile Video Coding (Draft 8)", Joint Video Experts Team (JVET) of ITU-T SG 16 WP 3 and ISO/IEC JTC 1/SC 29/WG 11, 17th Meeting: Brussels, BE, Jan. 7-17, 2020, Document: JVET-Q2001-vE, 515 Pages.

Bross B., et al., "Versatile Video Coding (Draft 8)", Joint Video Experts Team (JVET) of ITU-T SG 16 WP 3 and ISO/IEC JTC 1/SC 29/WG 11, 17th Meeting: Brussels, BE, Jan. 7-17, 2020, Document: JVET-Q2001-vA, 519 Pages.

Chen J., et al., "Algorithm Description of Joint Exploration Test Model 1," 1, JVET Meeting, Oct. 19-21, 2015, Geneva;(The Joint Video Exploration Team of ISO/IEC JTC1/SC29/WG11 and ITU-T SG.16); URL: http://phenix.int-evry.fr/jvet/,, No. JVET-A1001 Feb. 24, 2016 (Feb. 24, 2016), XP030150000, 27 pages.

Chen J., et al., "JVET-G1001: Algorithm Description of Joint Exploration Test Model 7 (JEM7)", JVET-G1001-V1, Joint Video Exploration Team (JVET)of ITU-T SG 16 WP 3 and ISO/IEC JTC 1/SC 29/WG 11, 7th Meeting, Jul. 13, 2017-Jul. 21, 2017, Torino, Aug. 19, 2017 (Aug. 19, 2017), 51 Pages, XP030150980, pp. i-iv, Retrieved from the Internet: URL: http://phenix.int-evry.fr/jvet/doc_end_user/documents/7_Torino/wg11/JVET-G1001-v1.zip, p. 20, Paragraph 2.3.7—p. 23, Paragraph 2.3.7.6, p. 17, Paragraph 2.3.5—p. 18, section 2, sections 2.1.1.2.3.1. Abstract section "2.3.6. Affine motion compensation prediction" section "2.3.8. Bi-directional optical flow".

Hsiao Y., et al., "CE5-related: Simplified ALF syntax with removal of alf_ctb_use_first_aps_flag", Joint Video Experts Team (JVET) of ITU-T SG 16 WP 3 and ISO/IEC JTC 1/SC 29/WG 11, 16th Meeting: Geneva, CH Oct. 1-11, 2019, Document: JVET-P0162-v1, pp. 1-4.

Hu N., et al., "CE5: Coding Tree Block based Adaptive Loop Filter (CE5-4)", Joint Video Experts Team (JVET) of ITU-T SG 16 WP 3 and ISO/IEC JTC 1/SC 29/WG 11, JVET-N0415-v2, 14th Meeting: Geneva, CH, Mar. 19-27, 2019, 16 pages.

"Information technology—Dynamic Adaptive Streaming over HTTP {Dash)—Part 1: Media Presentation Description and Segment Formats," ISO/IEC 23009-1, International Standard, Draft third edition, Jan. 9, 2017, 216 pp.

ITU-T H.265, Series H: Audiovisual and Multimedia Systems, Infiastructure of Audigisual Services—Coding of Moving Video, High Efficiency Video Coding, The International Telecommunication Union, Jun. 2019, 696 Pages.

Liu H., et al., "Non-CE5: Cleanup of ALF Syntax Elements", Joint Video Experts Team (JVET) of ITU-T SG 16 WP 3 and ISO/IEC JTC 1/SC 29/WG 11, 16th Meeting: Geneva, CH, Oct. 1-11, 2019, Document: JVET-P0180-v1, pp. 1-8.

* cited by examiner

ADAPTIVE LOOP FILTER SET INDEX SIGNALING

This application claims the benefit of U.S. Provisional Application 62/837,640, filed Apr. 23, 2019, the entire content of which is hereby incorporated by reference.

TECHNICAL FIELD

This disclosure relates to video encoding and video decoding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video picture or a portion of a video picture) may be partitioned into video blocks, which may also be referred to as coding tree units (CTUs), coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to as reference frames.

SUMMARY

In general, this disclosure describes techniques for adaptive loop filter (ALF) set index signaling. The example techniques may be utilized in video standards currently under development such as the Versatile Video Coding (VVC) standard, existing video coding standards such as the high efficiency video coding (HEVC) standard, or other future video coding standards. The example techniques need not necessarily be limited to particular video coding standards and may be applicable generally to video coding techniques that utilize adaptive loop filtering.

In adaptive loop filtering, a block is filtered using filter coefficients of filters. There may be two sources for the filters: adaptive filters and fixed (e.g., predefined) filters. The adaptive filters may be signaled in one or more parameter sets (e.g., adaptation parameter sets (APSs)). In some examples, a video encoder may signal information indicating a number of parameter sets that may be referred to for accessing adaptive filters and may signal information indicating whether adaptive filters or fixed filters are to be used. There may be inefficiencies in such signaling techniques. For example, if the number of parameter sets that may be referred to for accessing adaptive filters is zero, then only fixed filters are available for the adaptive loop filtering. However, some techniques may still unnecessarily signal information of whether adaptive filters or fixed filter are to be used.

This disclosure describes example techniques where if the number of parameter sets that a current coding structure (e.g., current slice, picture, tile, tile group, or brick) of video data that includes a current block of the video data, for which adaptive loop filtering is enabled, is equal to zero, then the video encoder may bypass signaling information indicating whether adaptive filters or fixed filters are to be used. In such examples, the video decoder may determine that a fixed filter is to be used for adaptive loop filtering without receiving a syntax element that indicates whether one of the set of fixed filters is to be used for adaptive loop filtering.

In this way, the example techniques described in this disclosure provide a practical application for determining which filters to use for adaptive loop filtering that promotes bandwidth efficiency. For example, this disclosure describes example techniques that reduce the amount of signaling needed without impacting video quality by bypassing the signaling of information indicating whether adaptive filters or fixed filters are to be used when it is possible to infer that fixed filters are to be used for adaptive loop filtering. By reducing the amount of signaling, the one or more example techniques may provide an improvement in efficiency and performance in video coding technology.

In one example, the disclosure describes a method of decoding video data, the method comprising determining that a number of parameter sets, which each include one or more adaptive filters for adaptive loop filtering, that a current coding structure of the video data refers to for adaptive loop filtering is equal to zero, wherein the current coding structure includes a current block of the video data for which adaptive loop filtering is enabled, and wherein the current coding structure comprises one of a current slice, picture, tile, tile group, or brick, based on the number of the parameter sets that the current coding structure refers to for adaptive loop filtering being equal to zero, determining which fixed filter from a set of fixed filters to use for adaptive loop filtering without receiving a syntax element that indicates whether one of the set of fixed filters is to be used for adaptive loop filtering, and performing adaptive loop filtering on the current block based on the fixed filter from the set of fixed filters.

In one example, the disclosure describes a device for decoding video data, the device comprising a memory configured to store parameter sets, which each include one or more adaptive filters for adaptive loop filtering and processing circuitry. The processing circuitry is configured to determine that a number of the parameter sets that a current coding structure of the video data refers to for adaptive loop filtering is equal to zero, wherein the current coding structure includes a current block of the video data for which adaptive loop filtering is enabled, and wherein the current coding structure comprises one of a current slice, picture, tile, tile group, or brick, based on the number of the parameter sets that the current coding structure refers to for adaptive loop filtering being equal to zero, determine which fixed filter from a set of fixed filters to use for adaptive loop filtering without receiving a syntax element that indicates whether one of the set of fixed filters is to be used for adaptive loop filtering, and perform adaptive loop filtering on the current block based on the fixed filter from the set of fixed filters.

In one example, the disclosure describes a device for decoding video data, the device comprising means for determining that a number of parameter sets, which each include one or more adaptive filters for adaptive loop filtering, that a current coding structure of the video data refers to for adaptive loop filtering is equal to zero, wherein the current coding structure includes a current block of the video data for which adaptive loop filtering is enabled, and wherein the current coding structure comprises one of a current slice, picture, tile, tile group, or brick, means for determining which fixed filter from a set of fixed filters to use for adaptive loop filtering without receiving a syntax element that indicates whether one of the set of fixed filters is to be used for adaptive loop filtering based on the number of the parameter sets that the current coding structure refers to for adaptive loop filtering being equal to zero, and means for performing adaptive loop filtering on the current block based on the fixed filter from the set of fixed filters.

In one example, the disclosure describes a computer-readable storage medium storing instructions thereon that when executed cause one or more processors to determine that a number of parameter sets, which each include one or more adaptive filters for adaptive loop filtering, that a current coding structure of video data refers to for adaptive loop filtering is equal to zero, wherein the current coding structure includes a current block of the video data for which adaptive loop filtering is enabled, and wherein the current coding structure comprises one of a current slice, picture, tile, tile group, or brick, determine which fixed filter from a set of fixed filters to use for adaptive loop filtering without receiving a syntax element that indicates whether one of the set of fixed filters is to be used for adaptive loop filtering based on the number of the parameter sets that the current coding structure refers to for adaptive loop filtering being equal to zero, and perform adaptive loop filtering on the current block based on the fixed filter from the set of fixed filters.

In one example, the disclosure describes a method of encoding video data, the method comprising determining that a number of parameter sets, which each include one or more adaptive filters for adaptive loop filtering, and which a current coding structure of the video data refers to for adaptive loop filtering, is equal to zero, wherein the current coding structure includes a current block of the video data for which adaptive loop filtering is enabled, and wherein the current coding structure comprises one of a current slice, picture, tile, tile group, or brick, based on the number of the parameter sets that the current coding structure refers to for adaptive loop filtering being equal to zero, determining which fixed filter from a set of fixed filters to use for adaptive loop filtering, based on the number of the parameter sets that the current coding structure refers to for adaptive loop filtering being equal to zero, bypassing signaling of a syntax element that indicates whether one of the set of fixed filters is to be used for adaptive loop filtering, and performing adaptive loop filtering on the current block based on the fixed filter from the set of fixed filters.

In one example, the disclosure describes a device for encoding video data, the device comprising a memory configured to store parameter sets, which each include one or more adaptive filters for adaptive loop filtering and processing circuitry. The processing circuitry is configured to determine that a number of the parameter sets that a current coding structure of the video data refers to for adaptive loop filtering is equal to zero, wherein the current coding structure includes a current block of video data, for which adaptive loop filtering is enabled, based on the number of the parameter sets that the current coding structure refers to for adaptive loop filtering being equal to zero, determine which fixed filter from a set of fixed filters to use for adaptive loop filtering, based on the number of the parameter sets that the current coding structure refers to for adaptive loop filtering being equal to zero, bypass signaling of a syntax element that indicates whether one of the set of fixed filters is to be used for adaptive loop filtering, and perform adaptive loop filtering on the current block based on the fixed filter from the set of fixed filters.

The details of one or more examples are set forth in the accompanying drawings and the description below. Other features, objects, and advantages will be apparent from the description, drawings, and claims.

DETAILED DESCRIPTION

Figure 1:
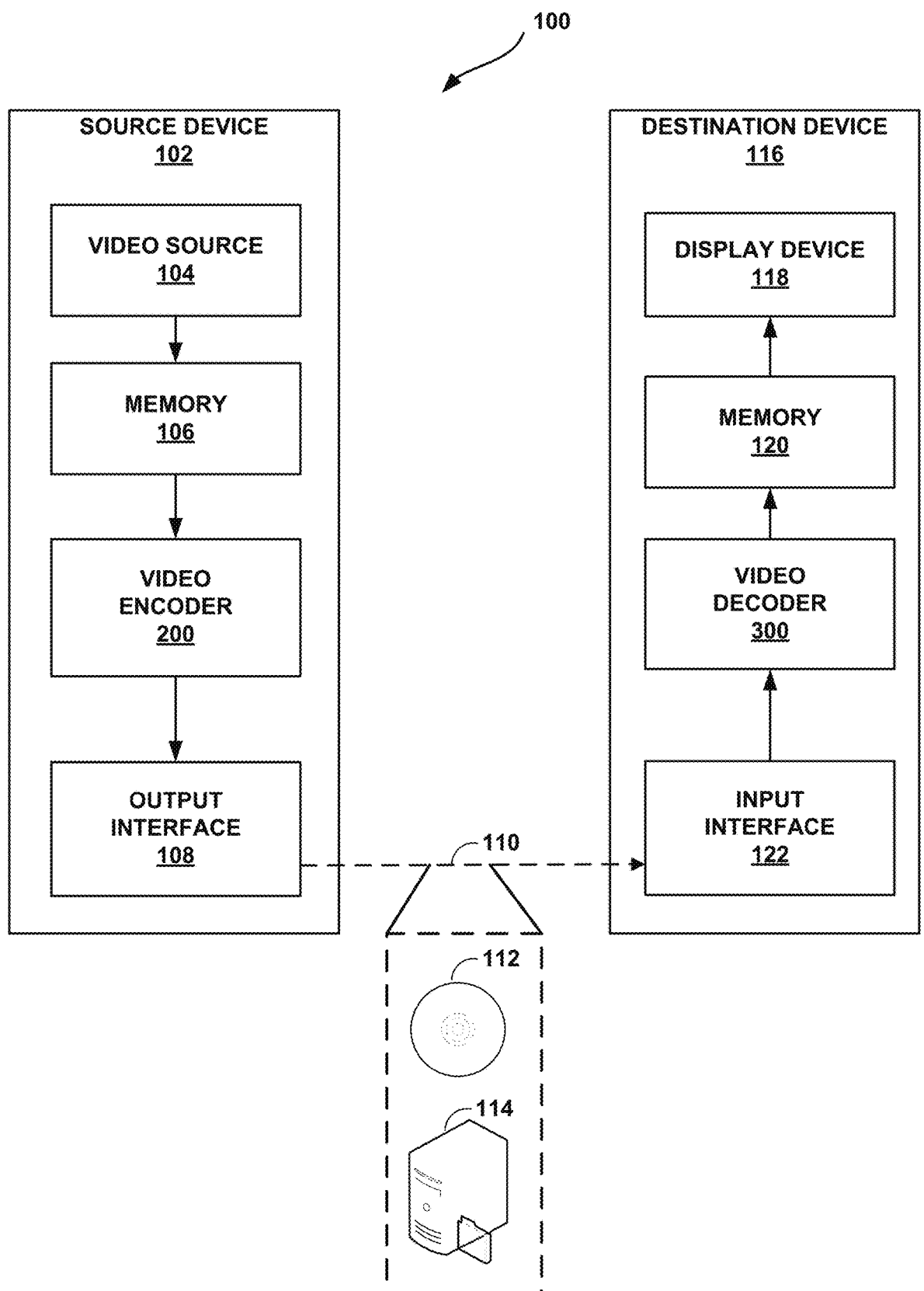
FIG. 1 is a block diagram illustrating an example video encoding and decoding system that may perform the techniques of this disclosure.

A video decoder may receive information for residual values between a current block and a prediction block. The video decoder may add the residual values to the prediction block to reconstruct the current block. However, in some cases, there may be some artifacts in the reconstructed current block, such as mean square error between the original samples of the current block and the samples of the reconstructed current block. To address the artifacts, the video decoder performs an adaptive loop filtering (ALF) process on the reconstructed current block to filter the artifacts, to reduce mean square error between the original samples of the current block and the samples of the reconstructed current block. The filtered current block may then be output for display.

In some examples, the video decoder may use samples of the filtered current block as samples of a prediction block for inter-predicting a subsequent block. Accordingly, to ensure that the samples of a prediction block used by the video decoder are the same as samples of a prediction block used by a video encoder, the video encoder may similarly perform ALF as part of a reconstruction loop within the video encoder. ALF may not be enabled for all blocks, and the video encoder may signal information to the video decoder indicating whether ALF is enabled for a block, a slice that includes the block, or a picture that includes the block.

To perform ALF, the video encoder and video decoder utilize filters (e.g., filter coefficients) selected from a set of filters. There may be two sources for the set of filters. A first source of the set of filters may be filters that the video encoder determined for a picture, a slice, or a group of pictures that include the current block based on various characteristics of the picture, slice, or group of pictures. These filters are referred to as adaptive filters because the adaptive filters are generated based on characteristics of the particular picture, slice, or group of pictures. The video encoder may signal the adaptive filters to the video decoder in one or more parameter sets such as one or more adaptation parameter sets (APSs).

Another source of the set of filters may be pre-defined filters with which the video decoder is pre-configured. For example, a memory of the video decoder may pre-store the pre-defined filters. However, there may be other ways in which the video decoder receives the pre-defined filters, including possible signaling of the pre-defined filters. Unlike the adaptive filters, the pre-defined filters may not be generated based on particular pictures, slices, or group of pictures but may rather be known filters that generally provide adequate level of filtering without needing to be specified for particular pictures, slices, or group of pictures. The pre-defined filters may be referred to as fixed filters.

In some examples, the video encoder may signal (e.g., at a slice level or picture level) to the video decoder information indicating a number of parameters sets, which each include one or more adaptive filters, that a video decoder can refer to for performing adaptive loop filtering for blocks within a slice or picture. Then, the video encoder may signal (e.g., at a block level) information (e.g., a flag) indicating whether adaptive filters are to be used or not be used for adaptive loop filtering a current block within the slice or picture.

As an example, a video encoder may signal information indicating that there are N number of parameter sets (e.g., APSs), where each APS includes one or more adaptive filters, that the video decoder can refer to for performing adaptive loop filtering. The video encoder may signal information that indicates that for a current block, adaptive loop filtering is enabled. The video encoder may then signal information indicating which APSs to refer to for the adaptive filters for performing adaptive loop filtering.

In some cases, it may be possible that the number of parameter sets, which each include one or more adaptive filters, and which the video decoder can refer to for performing adaptive loop filtering within a slice or picture, is zero (e.g., N=0). However, some techniques still signal information indicating whether adaptive filters are to be used or not be used for adaptive loop filtering a current block within the slice or picture.

Some of these techniques may be inefficient in terms of bandwidth utilization. For instance, if the number of parameter sets, which each include one or more adaptive filters, and which the video decoder can refer to for performing adaptive loop filtering within a slice or picture, is zero (e.g., if N=0), then only fixed filters may be used for adaptive loop filtering blocks within the slice or picture because the parameter sets that include adaptive filters may not be available to the video decoder to access (e.g., because the video encoder indicated that N=0). However, some of these techniques still signal information indicating that adaptive filters are not to be used (e.g., only fixed filters are to be used) for adaptive loop filtering, which wastes bandwidth and requires additional processing by the video encoder and video decoder, which wastes computational resources. In other words, when N=0, only fixed filters are to be used for adaptive loop filtering; therefore, there is bandwidth and computational waste in signaling a flag that indicates whether adaptive filters are to be used for adaptive loop filtering.

This disclosure describes example techniques of bypassing signaling of information that indicates whether adaptive filters are used or not used for a current block when a number of parameter sets, which each include one or more adaptive filters, and which the video decoder can refer to for performing adaptive loop filtering within a slice or picture, is zero. For instance, the video decoder may determine (e.g., infer) that only fixed filters are to be used for blocks of a slice or picture when the number of parameter sets, which each include one or more adaptive filters, and which the video decoder can refer to for performing adaptive loop filtering within a slice or picture, is zero. Stated another way, the video decoder may, based on the number of the parameter sets that the current coding structure (e.g., current slice, picture, tile, tile group, or brick) of the video data refers to for adaptive loop filtering being equal to zero, determine which fixed filter from a set of fixed filters to use for adaptive loop filtering without receiving a syntax element that indicates whether one of the set of fixed filters is to be used for adaptive loop filtering (e.g., without receiving a syntax element that indicates whether adaptive filters are not used).

In this way, the example techniques promote bandwidth efficiency and processing efficiency of the video encoder and video decoder. For example, the example techniques result in better operation and reduction in bandwidth consumption that improves the operation of a video encoder or decoder as part of a practical application of determining filters to use for adaptive loop filtering in the technology of video coding.

FIG. 1 is a block diagram illustrating an example video encoding and decoding system 100 that may perform the techniques of this disclosure. The techniques of this disclosure are generally directed to coding (encoding and/or decoding) video data. In general, video data includes any data for processing video. Thus, video data may include raw, unencoded video, encoded video, decoded (e.g., reconstructed) video, and video metadata, such as signaling data.

As shown in FIG. 1, system 100 includes a source device 102 that provides encoded video data to be decoded and displayed by a destination device 116, in this example. In particular, source device 102 provides the video data to destination device 116 via a computer-readable medium 110. Source device 102 and destination device 116 may comprise any of a wide range of devices, including desktop computers, notebook (i.e., laptop) computers, tablet computers, set-top boxes, telephone handsets such smartphones, televisions, cameras, display devices, digital media players, video gaming consoles, video streaming device, broadcast receiver devices, or the like. In some examples, source device 102 and/or destination device 116 may be a mobile device. In some cases, source device 102 and destination device 116 may be equipped for wireless communication, and thus may be referred to as wireless communication devices.

In the example of FIG. 1, source device 102 includes video source 104, memory 106, video encoder 200, and output interface 108. Destination device 116 includes input interface 122, video decoder 300, memory 120, and display device 118. In accordance with this disclosure, video encoder 200 of source device 102 and video decoder 300 of destination device 116 may be configured to apply the techniques for adaptive loop filter (ALF) filter set index signaling. Thus, source device 102 represents an example of a video encoding device, while destination device 116 represents an example of a video decoding device. In other examples, a source device and a destination device may include other components or arrangements. For example, source device 102 may receive video data from an external video source, such as an external camera. Likewise, destination device 116 may interface with an external display device, rather than including an integrated display device.

System 100 as shown in FIG. 1 is merely one example. In general, any digital video encoding and/or decoding device may perform techniques for signaling and receiving ALF filter set indices, as described in this disclosure. Source device 102 and destination device 116 are merely examples of such coding devices in which source device 102 generates coded video data for transmission to destination device 116. This disclosure refers to a "coding" device as a device that performs coding (encoding and/or decoding) of data. Thus, video encoder 200 and video decoder 300 represent examples of coding devices, in particular, a video encoder and a video decoder, respectively. In some examples, devices 102, 116 may operate in a substantially symmetrical manner such that each of devices 102, 116 include video encoding and decoding components. Hence, system 100 may support one-way or two-way video transmission between video devices 102, 116, e.g., for video streaming, video playback, video broadcasting, or video telephony.

In general, video source 104 represents a source of video data (i.e., raw, unencoded video data) and provides a sequential series of pictures (also referred to as "frames") of the video data to video encoder 200, which encodes data for the pictures. Video source 104 of source device 102 may include a video capture device, such as a video camera, a video archive containing previously captured raw video, and/or a video feed interface to receive video from a video content provider. As a further alternative, video source 104 may generate computer graphics-based data as the source video, or a combination of live video, archived video, and computer-generated video. In each case, video encoder 200 encodes the captured, pre-captured, or computer-generated video data. Video encoder 200 may rearrange the pictures from the received order (sometimes referred to as "display order") into a coding order for coding. Video encoder 200 may generate a bitstream including encoded video data. Source device 102 may then output the encoded video data via output interface 108 onto computer-readable medium 110 for reception and/or retrieval by, e.g., input interface 122 of destination device 116.

Memory 106 of source device 102 and memory 120 of destination device 116 represent general purpose memories. In some example, memories 106, 120 may store raw video data, e.g., raw video from video source 104 and raw, decoded video data from video decoder 300. Additionally or alternatively, memories 106, 120 may store software instructions executable by, e.g., video encoder 200 and video decoder 300, respectively. Although shown separately from video encoder 200 and video decoder 300 in this example, it should be understood that video encoder 200 and video decoder 300 may also include internal memories for functionally similar or equivalent purposes. Furthermore, memories 106, 120 may store encoded video data, e.g., output from video encoder 200 and input to video decoder 300. In some examples, portions of memories 106, 120 may be allocated as one or more video buffers, e.g., to store raw, decoded, and/or encoded video data.

Computer-readable medium 110 may represent any type of medium or device capable of transporting the encoded video data from source device 102 to destination device 116. In one example, computer-readable medium 110 represents a communication medium to enable source device 102 to transmit encoded video data directly to destination device 116 in real-time, e.g., via a radio frequency network or computer-based network. Output interface 108 may modulate a transmission signal including the encoded video data, and input interface 122 may modulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded video data.

In some examples, source device 102 may output encoded video data to file server 114 or another intermediate storage device that may store the encoded video generated by source device 102. Destination device 116 may access stored video data from file server 114 via streaming or download. File server 114 may be any type of server device capable of storing encoded video data and transmitting that encoded video data to the destination device 116. File server 114 may represent a web server (e.g., for a website), a File Transfer Protocol (FTP) server, a content delivery network device, or a network attached storage (NAS) device. Destination device 116 may access encoded video data from file server 114 through any standard data connection, including an Internet connection. This may include a wireless channel (e.g., a Wi-Fi connection), a wired connection (e.g., DSL, cable modem, etc.), or a combination of both that is suitable for accessing encoded video data stored on file server 114. File server 114 and input interface 122 may be configured to operate according to a streaming transmission protocol, a download transmission protocol, or a combination thereof.

Output interface 108 and input interface 122 may represent wireless transmitters/receiver, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded video data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded video data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to video encoder 200 and/or output interface 108, and destination device 116 may include an SoC device to perform the functionality attributed to video decoder 300 and/or input interface 122.

The techniques of this disclosure may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications.

Input interface 122 of destination device 116 receives an encoded video bitstream from computer-readable medium 110 (e.g., storage device 112, file server 114, or the like). The encoded video bitstream computer-readable medium 110 may include signaling information defined by video encoder 200, which is also used by video decoder 300, such as syntax elements having values that describe characteristics and/or processing of video blocks or other coded units (e.g., slices, pictures, groups of pictures, sequences, or the like). Display device 118 displays decoded pictures of the decoded video data to a user. Display device 118 may represent any of a variety of display devices such as a cathode ray tube (CRT), a liquid crystal display (LCD), a plasma display, an organic light emitting diode (OLED) display, or another type of display device.

Although not shown in FIG. 1, in some examples, video encoder 200 and video decoder 300 may each be integrated with an audio encoder and/or audio decoder, and may include appropriate MUX-DEMUX units, or other hardware and/or software, to handle multiplexed streams including both audio and video in a common data stream. If applicable, MUX-DEMUX units may conform to the ITU H.223 multiplexer protocol, or other protocols such as the user datagram protocol (UDP).

Video encoder 200 and video decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 200 and video decoder 300 may be included in one or more encoders or decoders, either of which may be integrated as part of a combined encoder/decoder (CODEC) in a respective device. A device including video encoder 200 and/or video decoder 300 may comprise an integrated circuit, a microprocessor, and/or a wireless communication device, such as a cellular telephone.

Video encoder 200 and video decoder 300 may operate according to a video coding standard, such as ITU-T H.265, also referred to as High Efficiency Video Coding (HEVC) or extensions thereto, such as the multi-view and/or scalable video coding extensions. Alternatively, video encoder 200 and video decoder 300 may operate according to other proprietary or industry standards, such as ITU-T H.266, also referred to as Versatile Video Coding (VVC), currently under development. One draft of the VVC standard is described in Bross, et al. "Versatile Video Coding (Draft 5)," Joint Video Experts Team (JVET) of ITU-T SG 16 WP 3 and ISO/IEC JTC 1/SC 29/WG 11, 14$^{th}$ Meeting: Geneva, CH, 19-27 Mar. 2019, JVET-N1001-v2 (hereinafter "VVC Draft 5"). A recent draft of the VVC standard is described in Bross, et al. "Versatile Video Coding (Draft 8)," Joint Video Experts Team (JVET) of ITU-T SG 16 WP 3 and ISO/IEC JTC 1/SC 29/WG 11, 17$^{th}$ Meeting: Brussels, BE, 7-17 Jan. 2020, JVET-Q2001-vE (hereinafter "VVC Draft 8"). The techniques of this disclosure, however, are not limited to any particular coding standard.

In general, video encoder 200 and video decoder 300 may perform block-based coding of pictures. The term "block" generally refers to a structure including data to be processed (e.g., encoded, decoded, or otherwise used in the encoding and/or decoding process). For example, a block may include a two-dimensional matrix of samples of luminance and/or chrominance data. In general, video encoder 200 and video decoder 300 may code video data represented in a YUV (e.g., Y, Cb, Cr) format. That is, rather than coding red, green, and blue (RGB) data for samples of a picture, video encoder 200 and video decoder 300 may code luminance and chrominance components, where the chrominance components may include both red hue and blue hue chrominance components. In some examples, video encoder 200 converts received RGB formatted data to a YUV representation prior to encoding, and video decoder 300 converts the YUV representation to the RGB format. Alternatively, pre- and post-processing units (not shown) may perform these conversions.

This disclosure may generally refer to coding (e.g., encoding and decoding) of pictures to include the process of encoding or decoding data of the picture. Similarly, this disclosure may refer to coding of blocks of a picture to include the process of encoding or decoding data for the blocks, e.g., prediction and/or residual coding. An encoded video bitstream generally includes a series of values for syntax elements representative of coding decisions (e.g., coding modes) and partitioning of pictures into blocks. Thus, references to coding a picture or a block should generally be understood as coding values for syntax elements forming the picture or block.

Various blocks include coding units (CUs), prediction units (PUs), and transform units (TUs). In HEVC, a video coder (such as video encoder 200) partitions a coding tree unit (CTU) into CUs according to a quadtree structure. That is, the video coder partitions CTUs and CUs into four equal, non-overlapping squares, and each node of the quadtree has either zero or four child nodes. Nodes without child nodes may be referred to as "leaf nodes," and CUs of such leaf nodes may include one or more PUs and/or one or more TUs. The video coder may further partition PUs and TUs. For example, in HEVC, a residual quadtree (RQT) represents partitioning of TUs. In HEVC, PUs represent inter-prediction data, while TUs represent residual data. CUs that are intra-predicted include intra-prediction information, such as an intra-mode indication.

As another example, video encoder 200 and video decoder 300 may be configured to operate according to VVC. According to VVC, a video coder (such as video encoder 200) partitions a picture into a plurality of coding tree units (CTUs). Video encoder 200 may partition a CTU according to a tree structure, such as a quadtree-binary tree (QTBT) structure or Multi-Type Tree (MTT) structure. The QTBT structure removes the concepts of multiple partition types, such as the separation between CUs, PUs, and TUs of HEVC. A QTBT structure includes two levels: a first level partitioned according to quadtree partitioning, and a second level partitioned according to binary tree partitioning. A root node of the QTBT structure corresponds to a CTU. Leaf nodes of the binary trees correspond to coding units (CUs).

In an MTT partitioning structure, blocks may be partitioned using a quadtree (QT) partition, a binary tree (BT) partition, and one or more types of triple tree (TT) partitions. A triple tree partition is a partition where a block is split into three sub-blocks. In some examples, a triple tree partition divides a block into three sub-blocks without dividing the original block through the center. The partitioning types in MTT (e.g., QT, BT, and TT), may be symmetrical or asymmetrical.

In some examples, video encoder 200 and video decoder 300 may use a single QTBT or MTT structure to represent each of the luminance and chrominance components, while in other examples, video encoder 200 and video decoder 300 may use two or more QTBT or MTT structures, such as one QTBT/MTT structure for the luminance component and another QTBT/MTT structure for both chrominance components (or two QTBT/MTT structures for respective chrominance components).

In some examples, a CTU includes a coding tree block (CTB) of luma samples, two corresponding CTBs of chroma samples of a picture that has three sample arrays, or a CTB of samples of a monochrome picture or a picture that is coded using three separate color planes and syntax structures used to code the samples. A CTB may be an N×N block of samples for some value of N such that the division of a component into CTBs is a partitioning. A component is an array or single sample from one of the three arrays (luma and two chroma) that compose a picture in 4:2:0, 4:2:2, or 4:4:4 color format or the array or a single sample of the array that compose a picture in monochrome format. In some examples, a coding block is an M×N block of samples for some values of M and N such that a division of a CTB into coding blocks is a partitioning.

Video encoder 200 and video decoder 300 may be configured to use quadtree partitioning per HEVC, QTBT partitioning, MTT partitioning, or other partitioning structures. For purposes of explanation, the description of the techniques of this disclosure is presented with respect to QTBT partitioning. However, it should be understood that the techniques of this disclosure may also be applied to video coders configured to use quadtree partitioning, or other types of partitioning as well.

This disclosure may use "N×N" and "N by N" interchangeably to refer to the sample dimensions of a block (such as a CU or other video block) in terms of vertical and horizontal dimensions, e.g., 16×16 samples or 16 by 16 samples. In general, a 16×16 CU will have 16 samples in a vertical direction (y=16) and 16 samples in a horizontal direction (x=16). Likewise, an N×N CU generally has N samples in a vertical direction and N samples in a horizontal direction, where N represents a nonnegative integer value. The samples in a CU may be arranged in rows and columns. Moreover, CUs need not necessarily have the same number of samples in the horizontal direction as in the vertical direction. For example, CUs may comprise N×M samples, where M is not necessarily equal to N.

Video encoder 200 encodes video data for CUs representing prediction and/or residual information, and other information. The prediction information indicates how the CU is to be predicted in order to form a prediction block for the CU. The residual information generally represents sample-by-sample differences between samples of the CU prior to encoding and the prediction block.

To predict a CU, video encoder 200 may generally form a prediction block for the CU through inter-prediction or intra-prediction. Inter-prediction generally refers to predicting the CU from data of a previously coded picture, whereas intra-prediction generally refers to predicting the CU from previously coded data of the same picture. To perform inter-prediction, video encoder 200 may generate the prediction block using one or more motion vectors. Video encoder 200 may generally perform a motion search to identify a reference block that closely matches the CU, e.g., in terms of differences between the CU and the reference block. Video encoder 200 may calculate a difference metric using a sum of absolute difference (SAD), sum of squared differences (SSD), mean absolute difference (MAD), mean squared differences (MSD), or other such difference calculations to determine whether a reference block closely matches the current CU. In some examples, video encoder 200 may predict the current CU using uni-directional prediction or bi-directional prediction.

Some examples of VVC also provide an affine motion compensation mode, which may be considered an inter-prediction mode. In affine motion compensation mode, video encoder 200 may determine two or more motion vectors that represent non-translational motion, such as zoom in or out, rotation, perspective motion, or other irregular motion types.

To perform intra-prediction, video encoder 200 may select an intra-prediction mode to generate the prediction block. Some examples of VVC provide sixty-seven intra-prediction modes, including various directional modes, as well as planar mode and DC mode. In general, video encoder 200 selects an intra-prediction mode that describes neighboring samples to a current block (e.g., a block of a CU) from which to predict samples of the current block. Such samples may generally be above, above and to the left, or to the left of the current block in the same picture as the current block, assuming video encoder 200 codes CTUs and CUs in raster scan order (left to right, top to bottom).

Video encoder 200 encodes data representing the prediction mode for a current block. For example, for inter-prediction modes, video encoder 200 may encode data representing which of the various available inter-prediction modes is used, as well as motion information for the corresponding mode. For uni-directional or bi-directional inter-prediction, for example, video encoder 200 may encode motion vectors using advanced motion vector prediction (AMVP) or merge mode. Video encoder 200 may use similar modes to encode motion vectors for affine motion compensation mode.

Following prediction, such as intra-prediction or inter-prediction of a block, video encoder 200 may calculate residual data for the block. The residual data, such as a residual block, represents sample by sample differences between the block and a prediction block for the block, formed using the corresponding prediction mode. Video encoder 200 may apply one or more transforms to the residual block, to produce transformed data in a transform domain instead of the sample domain. For example, video encoder 200 may apply a discrete cosine transform (DCT), an integer transform, a wavelet transform, or a conceptually similar transform to residual video data. Additionally, video encoder 200 may apply a secondary transform following the first transform, such as a mode-dependent non-separable secondary transform (MDNSST), a signal dependent transform, a Karhunen-Loeve transform (KLT), or the like. Video encoder 200 produces transform coefficients following application of the one or more transforms.

As noted above, following any transforms to produce transform coefficients, video encoder 200 may perform quantization of the transform coefficients. Quantization generally refers to a process in which transform coefficients are quantized to possibly reduce the amount of data used to represent the coefficients, providing further compression. By performing the quantization process, video encoder 200 may reduce the bit depth associated with some or all of the coefficients. For example, video encoder 200 may round an n-bit value down to an m-bit value during quantization, where n is greater than m. In some examples, to perform quantization, video encoder 200 may perform a bitwise right-shift of the value to be quantized.

Following quantization, video encoder 200 may scan the transform coefficients, producing a one-dimensional vector from the two-dimensional matrix including the quantized transform coefficients. The scan may be designed to place higher energy (and therefore lower frequency) coefficients at the front of the vector and to place lower energy (and therefore higher frequency) transform coefficients at the back of the vector. In some examples, video encoder 200 may utilize a predefined scan order to scan the quantized transform coefficients to produce a serialized vector, and then entropy encode the quantized transform coefficients of the vector. In other examples, video encoder 200 may perform an adaptive scan. After scanning the quantized transform coefficients to form the one-dimensional vector, video encoder 200 may entropy encode the one-dimensional vector, e.g., according to context-adaptive binary arithmetic coding (CABAC). Video encoder 200 may also entropy encode values for syntax elements describing metadata associated with the encoded video data for use by video decoder 300 in decoding the video data.

To perform CABAC, video encoder 200 may assign a context within a context model to a symbol to be transmitted. The context may relate to, for example, whether neighboring values of the symbol are zero-valued or not. The probability determination may be based on a context assigned to the symbol.

Video encoder 200 may further generate syntax data, such as block-based syntax data, picture-based syntax data, and sequence-based syntax data, to video decoder 300, e.g., in a picture header, a block header, a slice header, or other syntax data, such as a sequence parameter set (SPS), picture parameter set (PPS), or video parameter set (VPS). Video decoder 300 may likewise decode such syntax data to determine how to decode corresponding video data.

In this manner, video encoder 200 may generate a bitstream including encoded video data, e.g., syntax elements describing partitioning of a picture into blocks (e.g., CUs) and prediction and/or residual information for the blocks. Ultimately, video decoder 300 may receive the bitstream and decode the encoded video data.

In general, video decoder 300 performs a reciprocal process to that performed by video encoder 200 to decode the encoded video data of the bitstream. For example, video decoder 300 may decode values for syntax elements of the bitstream using CABAC in a manner substantially similar to, albeit reciprocal to, the CABAC encoding process of video encoder 200. The syntax elements may define partitioning information of a picture into CTUs, and partitioning of each CTU according to a corresponding partition structure, such as a QTBT structure, to define CUs of the CTU. The syntax elements may further define prediction and residual information for blocks (e.g., CUs) of video data.

The residual information may be represented by, for example, quantized transform coefficients. Video decoder 300 may inverse quantize and inverse transform the quantized transform coefficients of a block to reproduce a residual block for the block. Video decoder 300 uses a signaled prediction mode (intra- or inter-prediction) and related prediction information (e.g., motion information for inter-prediction) to form a prediction block for the block. Video decoder 300 may then combine the prediction block and the residual block (on a sample-by-sample basis) to reproduce (e.g., reconstruct) the original block. Video decoder 300 may perform additional processing, such as performing a deblocking process or adaptive loop filtering to reduce visual artifacts along boundaries of the block.

This disclosure may generally refer to "signaling" certain information, such as syntax elements. The term "signaling" may generally refer to the communication of values syntax elements and/or other data used to decode encoded video data. That is, video encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

As described above, video decoder 300 may perform additional processing on the reconstructed block. For example, to further improve the quality of decoded video, video decoder 300 can perform one or more filtering operations on the reconstructed video blocks. Examples of these filtering operations include deblocking filtering, sample adaptive offset (SAO) filtering, and adaptive loop filtering (ALF). Parameters for these filtering operations (e.g., filters used for the filtering operations) may either be determined by video encoder 200 and explicitly signaled in the encoded video bitstream or may be implicitly determined by video decoder 300 without needing the parameters to be explicitly signaled in the encoded video bitstream.

This disclosure describes techniques related to filtering method(s) referred to as "Adaptive Loop Filter (ALF)." ALF may be used in a post-processing stage or for in-loop coding, or in a prediction process. To perform ALF, video decoder 300 may determine a filter set from candidate filter sets. Video encoder 200 may signal information that video decoder 300 utilizes to determine an index into a set of candidate filter sets. Some example techniques related to ALF and filter sets are described in the following: U.S. Patent Publication No. US 2019/0373258, U.S. patent application Ser. No. 16/822,990, filed Mar. 18, 2020, U.S. patent application Ser. No. 16/811,913, filed Mar. 6, 2020, and U.S. patent application Ser. No. 16/717,530, filed Dec. 17, 2019.

In the VVC Test Model 5 (VTM5), Hu, et al. "CE5: Coding tree block based adaptive loop filter (CE5-4)," Joint Video Experts Team (WET) of ITU-T SG 16 WP 3 and ISO/IEC JTC 1/SC 29/WG 11, 14th Meeting: Geneva, CH, 19-27 Mar. 2019, JVET-N0415 (hereinafter "WET-N0415") was adopted. In WET-N0415, in each tile group, when adaptive loop filter (ALF) is applied to a luma coding tree block (CTB), video encoder 200 or video decoder 300 may determine a filter set from a set of candidate filter sets for performing ALF filtering on the luma CTB). The filter set index (e.g., into the set of candidate filter sets) is signaled for the luma CTB. A fixed (pre-defined) filter set (e.g., fixed filters) and filter sets (e.g., adaptive filters) from adaptive parameter sets (APSs) could be used to make up a candidate set. At a tile group/slice/picture header, the information of APSs that are used for a current tile group is signaled. Let N denote the number of APSs (APS_ID[i], where i is 0, 1, 2 ... N−1) that a current tile group or slice is using. N could be from 0 to MAX_APS_NUM, where MAX_APS_NUM stands for the maximum number of APSs that are supported in a standard/format/sequence. In JVET-N0415, at first, N is signaled; then, all the APS IDs are signaled.

In JVET-N0415, for each luma CTB, a flag use_first_APS is signaled first to indicate whether the first signaled APS (APS_ID[0]) in the tile group/slice/picture header is used. If this flag is false, a flag use_fixed_filter is signaled. If use_fixed_filter is true, a fixed filter set index is signaled to indicate which fixed filter is used. Otherwise, an index is signaled to indicate which APS (APS_ID[i], where i is 1, 2 ... N−1) is used. If ALF is applied to a chroma component of a tile/tile group/slice/picture, an APS_ID chroma is signaled to indicate which APS the chroma filter is from.

There may be inefficiencies in the signaling used to determine which filter set to use for ALF. These inefficiencies in the signaling result in a technical problem of unnecessary bandwidth utilization. For example, in the above example techniques used for signaling information used to determine which filter set to use for ALF, there may be some redundant information which is unnecessary to be signaled.

In the above example, use_fixed_filter is a flag that is used to indicate whether a fixed filter is used for the current block, in which if use_fixed_filter flag is true, then a fixed filter is used and if use_fixed_filter flag is false, then an adaptive filter is used. However, use_fixed_filter is one name, and it should be understood that an inverse of use_fixed_filter may be used. For example, a flag labeled alf_use_aps_flag may be similar to use_fixed_filter but with the inverse logic. In some examples, alf_use_aps_flag being true means that the adaptive filter is used for a block, and alf_use_aps_flag being false means that the fixed filter is used. For example, alf_use_aps_flag may be defined as follows:

alf_use_aps_flag equal to 0 specifies that one of the fixed filter sets is applied to the luma CTB. alf_use_aps_flag equal to 1 specifies that a filter set from an APS is applied to the luma CTB. When alf_use_aps_flag is not present, it is inferred to be equal to 0.

Accordingly, use_fixed_filter and alf_use_aps_flag may be used to convey the same information but one flag is the logical inverse of the other. As explained above, use_fixed_filter being true means to use a fixed filter for ALF filtering a block, which is the same as alf_use_aps_flag being false, and use_fixed_filter being false means to use a filter (e.g., adaptive filter) from a parameter set (e.g., APS), which is the same as alf_use_aps_flag being true. In any event, both use_fixed_filter or alf_use_aps_flag may be considered as a syntax element of one or more syntax elements that indicate whether one of the set of fixed filters is to be used for adaptive loop filtering.

This disclosure describes example techniques that provide technical solutions for signaling and determining which filter set to use for ALF. In this way, the example techniques provide for a practical application for signaling and determining which filter set to use for ALF that promotes efficient bandwidth usage (e.g., by reducing signaling of redundant information) in a video coding process.

The following provides a listing of example techniques that video encoder 200 and/or video decoder 300 may perform in accordance with this disclosure. The example techniques may be performed separately or together in any applicable combination.

1. For an intra slices/frames/tile groups/tiles or for a slice/frame/tile groups/tile in an intra random access picture (TRAP), only the APS that generated from a current tile/tile group/slice/frame could be used, and N can only be either 0 or 1; therefore, only one bit is needed to signal it. For other ones, N can be from 0 to MAX_APS_NUM.
2. When N is 0, only fixed filters can be used for all CTB in current slice/frame/tile/tile groups. Then use_first_APS for all CTBs are not signaled and inferred to be false at the decoder side (e.g., by video decoder 300).

The flag use_fixed_filter is not signaled and inferred to be true at the decoder side (e.g., by video decoder 300).

3. When N is 1, if use_first_APS is false for a CTB, only fixed filters can be used for a current CTB. Then use_fixed_filter is not signaled and inferred to be true at the decoder side (e.g., by video decoder 300) for the current CTB.
4. Instead of MAX_APS_NUM, a variable could be signaled at the sequence parameter set (SPS) or picture parameter set (PPS) to indicate the max number of APSs that a slice/tile/tile groups/frame could use.
5. When Nis equal to MAX_APS_NUM, i.e., all APSs are used, then not all APS_ID[i] are necessary to be signaled (some are signaled, and others are not signaled).
    a. As one example, all APS_ID[i] are not signaled, and some default order is used, for example, at the decoder side (e.g., by video decoder 300), APS_ID[i]=i.
    b. As one example, only APS_ID[0] is signaled, and then other APS_ID[i] with I=1 ... N−1 are inferred (e.g., by video decoder 300). For example, APS_ID[i]=(APS_ID[i−1]+1)% MAX_APS_NUM.
    c. As one example, only some APS_ID[i] are signaled, and other APS_ID[i] could be inferred (e.g., by video decoder 300) based on the signaled ones.
6. For an intra slices/frames/tile groups/tiles or for a slice/frame/tile groups/tile in an intra random access picture (TRAP), only the APS that is generated from a current tile/tile group/slice/frame could be used. If N is 1 for a luma component and ALF is applied to a chroma component, the luma and chroma components have the same APS IDs. Then APS_ID chroma is not signaled for a chroma component and inferred to be APS_ID[0] at the decoder side (e.g., by video decoder 300).

In the above example, N denotes the number of APSs (APS_ID[i], where i is 0, 1, 2 ... N−1) that the current tile group or slice is using. In other words, N is referred to as a variable that indicates a number of parameter sets (e.g., APSs) that a current coding structure (e.g., current slice, picture, tile, tile group, or brick) of the video data that includes a current block of the video data can refer to for adaptive loop filtering. The parameter sets may each include one or more adaptive filters for adaptive loop filtering. In some examples, N may be referred to as slice_num_alf_aps_ids_luma or ph_num_alf_aps_ids. For instance, slice_num_alf_aps_ids_luma specifies the number of ALF APSs that the slice refers to. In some examples, slice_num_alf_aps_ids_luma may be signaled in the slice header and ph_num_alf_aps_ids may be signaled in the picture header. In some examples, slice_num_alf_aps_ids_luma or ph_num_alf_aps_ids may be signaled at some other signaling level hierarchically higher than at the block level. That is, slice_num_alf_aps_ids_luma and ph_num_alf_aps_ids may be signaled at a level that applies to one or more blocks, such as at a slice level that applies to the blocks within the slice and at a picture level that applies to the blocks within the pictures respectively.

As described above, in some examples, if N is 0, only fixed filters may be used for blocks within a slice. In such cases, there may be no need to signal use_fixed_filter. For instance, if N is 0, that means that video decoder 300 may not refer to any of the parameter sets (e.g., one or more APSs), which each include one or more adaptive filters for adaptive loop filtering. Therefore, the source for the filters for adaptive loop filtering is limited to fixed filters. In such cases, signaling a syntax element (e.g., use_fixed_filter), which may be an example of one or more syntax elements, that indicate to video decoder 300 that one of set of fixed filters is to be used for adaptive loop filtering is unnecessary. This is because with N being 0, fixed filters may be the only source of filters for adaptive loop filtering and signaling of a flag like use_fixed_filter is redundant. Again, as described above, N may be represented by slice_num_alf_aps_ids_luma or ph_num_alf_aps_ids, and instead of use_fixed_filter, alf_use_aps_flag may be used, which is the same as use_fixed_filter but with inverse logic.

Accordingly, in one or more examples, video encoder 200 may be configured to determine that a number of the parameter sets that a current coding structure (e.g., current slice, picture, tile, tile group, or brick) of the video data that includes a current block of the video data (e.g., luma CTB), for which adaptive loop filtering is enabled, refers to for adaptive loop filtering is equal to zero (e.g., N=0, slice_num_alf_aps_ids=0, or ph_num_alf_aps_ids=0). Examples of the parameter sets include the APSs.

Based on the number of the parameter sets that the current coding structure refers to for adaptive loop filtering being equal to zero, video encoder 200 may determine which fixed filter from a set of fixed filters to use for adaptive loop filtering. For instance, because slice_num_alf_aps_ids (e.g., N) is 0, only fixed filters may be available for adaptive loop filtering the current block, and video encoder 200 may determine which fixed filter to use.

Video encoder 200 may bypass signaling of a syntax element that indicates whether one of the set of fixed filters is to be used for adaptive loop filtering. For example, video encoder 200 may not signal use_fixed_filter, which is the same as alf_use_aps_flag but with opposite logic, because in this case video decoder 300 may determine (e.g., infer) that a fixed filter is used since slice_num_alf_aps_ids is 0.

Video encoder 200 may perform adaptive loop filtering on the current block based on the fixed filter from the set of fixed filters. Video encoder 200 may store the resulting filtered block in memory for inter-prediction of a subsequent block.

Video decoder 300 may be configured to determine that a number of parameter sets, which each include one or more adaptive filters for adaptive loop filtering, that a current coding structure (e.g., current slice, picture, tile, tile group, or brick) of the video data refers to for adaptive loop filtering is equal to zero. The current coding structure (e.g., current slice, picture, tile, tile group, or brick) includes a current block of the video data for which adaptive loop filtering is enabled.

For example, video decoder 300 may receive information indicative of the number of parameter sets the current coding structure (e.g., current slice, picture, tile, tile group, or brick) refers to for adaptive loop filtering (e.g., receive value for N), and in this example, video decoder 300 may receive information indicative of N being equal to 0 (e.g., receive information indicating that slice_num_alf_aps_ids is equal to 0). Examples of the parameter sets include the APSs.

Based on the number of the parameter sets that the current coding structure (e.g., current slice, picture, tile, tile group, or brick) refers to for adaptive loop filtering being equal to zero, video decoder 300 may determine which fixed filter from a set of fixed filters to use for adaptive loop filtering without receiving a syntax element that indicates whether one of the set of fixed filters is to be used for adaptive loop filtering. For example, based on the N being equal to 0, video decoder 300 may not receive use_fixed_filter (or alf_use_aps_flag). As described above, used_fixed_filter is an example of one or more syntax elements that indicate whether one of the set of fixed filters is to be used for adaptive loop filtering. In such examples, video decoder 300 may determine which fixed filter to use without needing one or more syntax elements explicitly indicating to video decoder 300 that one of the set of fixed filters is to be used.

For example, video decoder 300 may be configured to determine (e.g., infer) that a flag, which indicates whether one of the fixed filters or one of the adaptive filters from a parameter set is to be used for performing adaptive loop filtering indicates that one of the fixed filters is to be used for performing adaptive loop filtering. That is, video decoder 300 may determine (e.g., infer) that use_fixed_filter is true because N=0, and therefore does not need to receive the use_fixed_filter flag.

In some examples, to determine which fixed filter from the set of fixed filters to use for adaptive loop filtering without receiving a syntax element that indicates whether one of the set of fixed filters is to be used for adaptive loop filtering, video decoder 300 may be configured to receive an index into the set of fixed filters that identifies which fixed filter to use for adaptive loop filtering. Video decoder 300 may determine that a fixed filter is to be used based on the index.

Video decoder 300 may perform adaptive loop filtering on the current block based on the fixed filter from the set of fixed filters. Video decoder 300 may store the resulting filtered block in memory for use for inter-predicting a subsequent block and/or output the filtered block for display.

The above describes an example where N=0 (e.g., a number of the parameter sets that a current coding structure of the video data that includes a current block of the video data, for which adaptive loop filtering is enabled, refers to for adaptive loop filtering is equal to zero). However, in some cases, N is greater than 0. In such examples, video encoder 200 may signal to video decoder 300 a syntax element that indicates whether one of a set of fixed filters is to be used for adaptive loop filtering (e.g., signal use_fixed_filter).

For example, the above example refers to a current coding structure and a current block. In some examples, the current coding structure is a first coding structure and the current block is a first block. Video decoder 300 may determine that a number of the parameter sets that a second coding structure that includes a second block, for which adaptive loop filtering is enabled, refers to for adaptive loop filtering is greater than zero. For instance, N (e.g., slice_num_alf_aps_ids) is greater than zero for a second coding structure that includes a second block.

Based on the number of the parameter sets that the second coding structure refers to for adaptive loop filtering being greater than zero (e.g., based on N being greater than 0), video decoder 300 may receive use_fixed_filter that indicates that adaptive filters are to be used and video decoder 300 determines which one of the parameter sets includes an adaptive filter to be used for performing adaptive loop filtering on the second block. To determine which one of the parameter sets includes the adaptive filter to be used for performing adaptive loop filtering on the second block, video decoder 300 may be configured to receive information indicative of which one of the parameter sets includes the adaptive filter to be used for performing adaptive loop filtering on the second block. Video decoder 300 may perform adaptive loop filtering on the second block based on the adaptive filter in the determined one of the parameter sets.

Figure 2A:
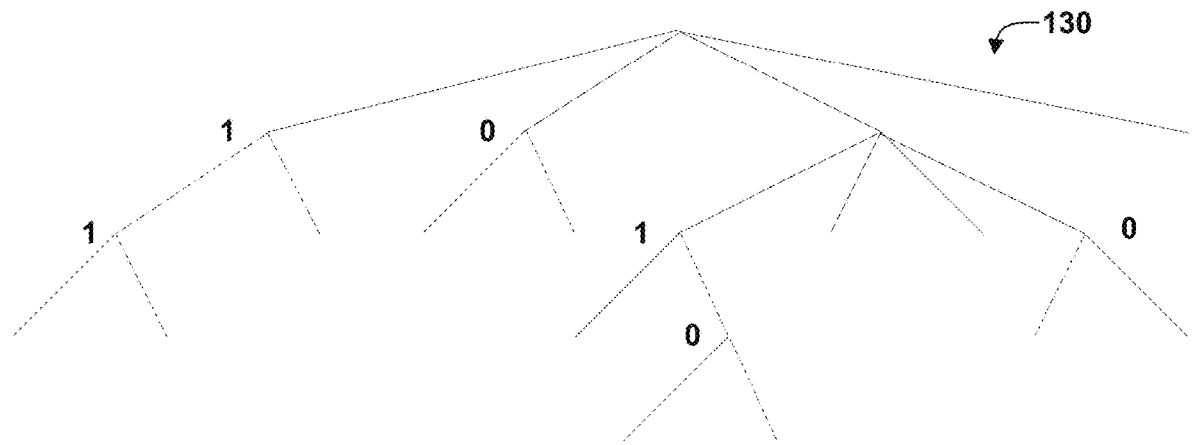
FIGS. 2A and 2B are conceptual diagrams illustrating an example quadtree binary tree (QTBT) structure, and a corresponding coding tree unit (CTU).
Figure 2B:
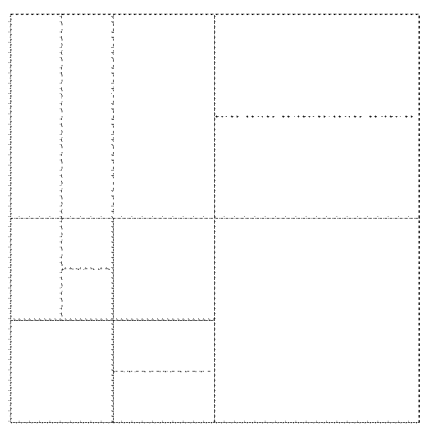

FIGS. 2A and 2B are conceptual diagrams illustrating an example quadtree binary tree (QTBT) structure 130, and a corresponding coding tree unit (CTU) 132. The solid lines represent quadtree splitting, and dotted lines indicate binary tree splitting. In each split (i.e., non-leaf) node of the binary tree, one flag is signaled to indicate which splitting type (i.e., horizontal or vertical) is used, where 0 indicates horizontal splitting and 1 indicates vertical splitting in this example. For the quadtree splitting, there is no need to indicate the splitting type, since quadtree nodes split a block horizontally and vertically into 4 sub-blocks with equal size. Accordingly, video encoder 200 may encode, and video decoder 300 may decode, syntax elements (such as splitting information) for a region tree level of QTBT structure 130 (i.e., the solid lines) and syntax elements (such as splitting information) for a prediction tree level of QTBT structure 130 (i.e., the dashed lines). Video encoder 200 may encode, and video decoder 300 may decode, video data, such as prediction and transform data, for CUs represented by terminal leaf nodes of QTBT structure 130.

In general, CTU 132 of FIG. 2B may be associated with parameters defining sizes of blocks corresponding to nodes of QTBT structure 130 at the first and second levels. These parameters may include a CTU size (representing a size of CTU 132 in samples), a minimum quadtree size (MinQTSize, representing a minimum allowed quadtree leaf node size), a maximum binary tree size (MaxBTSize, representing a maximum allowed binary tree root node size), a maximum binary tree depth (MaxBTDepth, representing a maximum allowed binary tree depth), and a minimum binary tree size (MinBTSize, representing the minimum allowed binary tree leaf node size).

The root node of a QTBT structure corresponding to a CTU may have four child nodes at the first level of the QTBT structure, each of which may be partitioned according to quadtree partitioning. That is, nodes of the first level are either leaf nodes (having no child nodes) or have four child nodes. The example of QTBT structure 130 represents such nodes as including the parent node and child nodes having solid lines for branches. If nodes of the first level are not larger than the maximum allowed binary tree root node size (MaxBTSize), they can be further partitioned by respective binary trees. The binary tree splitting of one node can be iterated until the nodes resulting from the split reach the minimum allowed binary tree leaf node size (MinBTSize) or the maximum allowed binary tree depth (MaxBTDepth). The example of QTBT structure 130 represents such nodes as having dashed lines for branches. The binary tree leaf node is referred to as a coding unit (CU), which is used for prediction (e.g., intra-picture or inter-picture prediction) and transform, without any further partitioning. As discussed above, CUs may also be referred to as "video blocks" or "blocks."

In one example of the QTBT partitioning structure, the CTU size is set as 128×128 (luma samples and two corresponding 64×64 chroma samples), the MinQTSize is set as 16×16, the MaxBTSize is set as 64×64, the MinBTSize (for both width and height) is set as 4, and the MaxBTDepth is set as 4. The quadtree partitioning is applied to the CTU first to generate quad-tree leaf nodes. The quadtree leaf nodes may have a size from 16×16 (i.e., the MinQTSize) to 128×128 (i.e., the CTU size). If the leaf quadtree node is 128×128, it will not be further split by the binary tree, since the size exceeds the MaxBTSize (i.e., 64×64, in this example). Otherwise, the leaf quadtree node will be further partitioned by the binary tree. Therefore, the quadtree leaf node is also the root node for the binary tree and has the binary tree depth as 0. When the binary tree depth reaches MaxBTDepth (4, in this example), no further splitting is permitted. When the binary tree node has width equal to MinBTSize (4, in this example), it implies no further horizontal splitting is permitted. Similarly, a binary tree node having a height equal to MinBTSize implies no further vertical splitting is permitted for that binary tree node. As noted above, leaf nodes of the binary tree are referred to as CUs, and are further processed according to prediction and transform without further partitioning.

Figure 3:
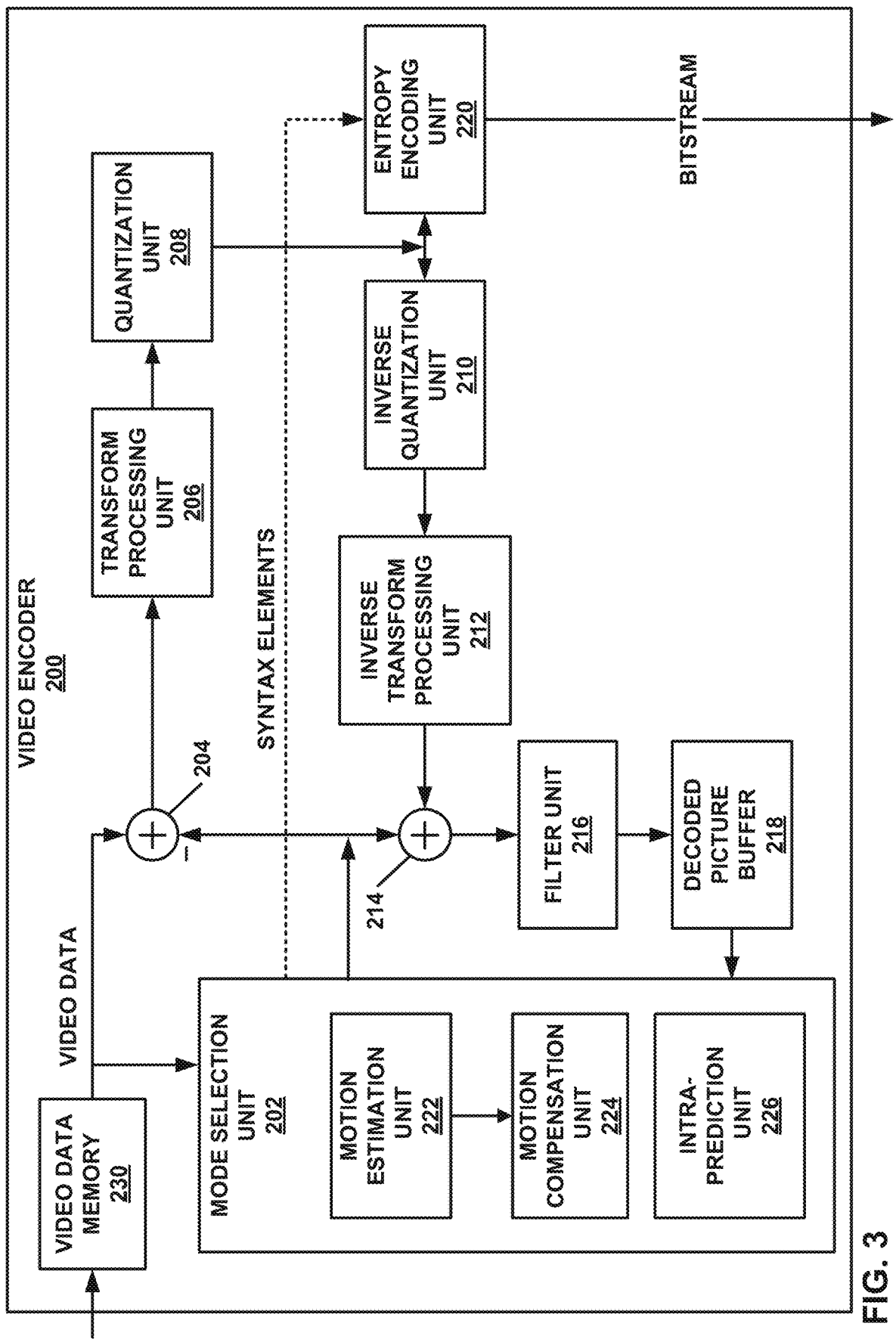
FIG. 3 is a block diagram illustrating an example video encoder that may perform the techniques of this disclosure.

FIG. 3 is a block diagram illustrating an example video encoder 200 that may perform the techniques of this disclosure. FIG. 3 is provided for purposes of explanation and should not be considered limiting of the techniques as broadly exemplified and described in this disclosure. For purposes of explanation, this disclosure describes video encoder 200 in the context of video coding standards such as the HEVC/H.265 video coding standard and the VVC/H.266 video coding standard in development. However, the techniques of this disclosure are not limited to these video coding standards, and are applicable generally to video encoding and decoding.

In the example of FIG. 3, video encoder 200 includes video data memory 230, mode selection unit 202, residual generation unit 204, transform processing unit 206, quantization unit 208, inverse quantization unit 210, inverse transform processing unit 212, reconstruction unit 214, filter unit 216, decoded picture buffer (DPB) 218, and entropy encoding unit 220. Any or all of video data memory 230, mode selection unit 202, residual generation unit 204, transform processing unit 206, quantization unit 208, inverse quantization unit 210, inverse transform processing unit 212, reconstruction unit 214, filter unit 216, DPB 218, and entropy encoding unit 220 may be implemented in one or more processors or in processing circuitry. Moreover, video encoder 200 may include additional or alternative processors or processing circuitry to perform these and other functions.

Video data memory 230 may store video data to be encoded by the components of video encoder 200. Video encoder 200 may receive the video data stored in video data memory 230 from, for example, video source 104 (FIG. 1). DPB 218 may act as a reference picture memory that stores reference video data for use in prediction of subsequent video data by video encoder 200. Video data memory 230 and DPB 218 may be formed by any of a variety of memory devices, such as dynamic random access memory (DRAM), including synchronous DRAM (SDRAM), magnetoresistive RAM (MRAM), resistive RAM (RRAM), or other types of memory devices. Video data memory 230 and DPB 218 may be provided by the same memory device or separate memory devices. In various examples, video data memory 230 may be on-chip with other components of video encoder 200, as illustrated, or off-chip relative to those components.

In this disclosure, reference to video data memory 230 should not be interpreted as being limited to memory internal to video encoder 200, unless specifically described as such, or memory external to video encoder 200, unless specifically described as such. Rather, reference to video data memory 230 should be understood as reference memory that stores video data that video encoder 200 receives for encoding (e.g., video data for a current block that is to be encoded). Memory 106 of FIG. 1 may also provide temporary storage of outputs from the various units of video encoder 200.

The various units of FIG. 3 are illustrated to assist with understanding the operations performed by video encoder 200. The units may be implemented as fixed-function circuits, programmable circuits, or a combination thereof. Fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video encoder 200 may include arithmetic logic units (ALUs), elementary function units (EFUs), digital circuits, analog circuits, and/or programmable cores, formed from programmable circuits. In examples where the operations of video encoder 200 are performed using software executed by the programmable circuits, memory 106 (FIG. 1) may store the object code of the software that video encoder 200 receives and executes, or another memory within video encoder 200 (not shown) may store such instructions.

Video data memory 230 is configured to store received video data. Video encoder 200 may retrieve a picture of the video data from video data memory 230 and provide the video data to residual generation unit 204 and mode selection unit 202. Video data in video data memory 230 may be raw video data that is to be encoded.

Mode selection unit 202 includes a motion estimation unit 222, motion compensation unit 224, and an intra-prediction unit 226. Mode selection unit 202 may include additional functional units to perform video prediction in accordance with other prediction modes. As examples, mode selection unit 202 may include a palette unit, an intra-block copy unit (which may be part of motion estimation unit 222 and/or motion compensation unit 224), an affine unit, a linear model (LM) unit, or the like.

Mode selection unit 202 generally coordinates multiple encoding passes to test combinations of encoding parameters and resulting rate-distortion values for such combinations. The encoding parameters may include partitioning of CTUs into CUs, prediction modes for the CUs, transform types for residual data of the CUs, quantization parameters for residual data of the CUs, and so on. Mode selection unit 202 may ultimately select the combination of encoding parameters having rate-distortion values that are better than the other tested combinations.

Video encoder 200 may partition a picture retrieved from video data memory 230 into a series of CTUs, and encapsulate one or more CTUs within a slice. Mode selection unit 202 may partition a CTU of the picture in accordance with a tree structure, such as the QTBT structure or the quad-tree structure of HEVC described above. As described above, video encoder 200 may form one or more CUs from partitioning a CTU according to the tree structure. Such a CU may also be referred to generally as a "video block" or "block."

In general, mode selection unit 202 also controls the components thereof (e.g., motion estimation unit 222, motion compensation unit 224, and intra-prediction unit 226) to generate a prediction block for a current block (e.g., a current CU, or in HEVC, the overlapping portion of a PU and a TU). For inter-prediction of a current block, motion estimation unit 222 may perform a motion search to identify one or more closely matching reference blocks in one or more reference pictures (e.g., one or more previously coded pictures stored in DPB 218). In particular, motion estimation unit 222 may calculate a value representative of how similar a potential reference block is to the current block, e.g., according to sum of absolute difference (SAD), sum of squared differences (SSD), mean absolute difference (MAD), mean squared differences (MSD), or the like. Motion estimation unit 222 may generally perform these calculations using sample-by-sample differences between the current block and the reference block being considered. Motion estimation unit 222 may identify a reference block having a lowest value resulting from these calculations, indicating a reference block that most closely matches the current block.

Motion estimation unit 222 may form one or more motion vectors (MVs) that defines the positions of the reference blocks in the reference pictures relative to the position of the current block in a current picture. Motion estimation unit 222 may then provide the motion vectors to motion compensation unit 224. For example, for uni-directional inter-prediction, motion estimation unit 222 may provide a single motion vector, whereas for bi-directional inter-prediction, motion estimation unit 222 may provide two motion vectors. Motion compensation unit 224 may then generate a prediction block using the motion vectors. For example, motion compensation unit 224 may retrieve data of the reference block using the motion vector. As another example, if the motion vector has fractional sample precision, motion compensation unit 224 may interpolate values for the prediction block according to one or more interpolation filters. Moreover, for bi-directional inter-prediction, motion compensation unit 224 may retrieve data for two reference blocks identified by respective motion vectors and combine the retrieved data, e.g., through sample-by-sample averaging or weighted averaging.

As another example, for intra-prediction, or intra-prediction coding, intra-prediction unit 226 may generate the prediction block from samples neighboring the current block. For example, for directional modes, intra-prediction unit 226 may generally mathematically combine values of neighboring samples and populate these calculated values in the defined direction across the current block to produce the prediction block. As another example, for DC mode, intra-prediction unit 226 may calculate an average of the neighboring samples to the current block and generate the prediction block to include this resulting average for each sample of the prediction block.

Mode selection unit 202 provides the prediction block to residual generation unit 204. Residual generation unit 204 receives a raw, unencoded version of the current block from video data memory 230 and the prediction block from mode selection unit 202. Residual generation unit 204 calculates sample-by-sample differences between the current block and the prediction block. The resulting sample-by-sample differences define a residual block for the current block. In some examples, residual generation unit 204 may also determine differences between sample values in the residual block to generate a residual block using residual differential pulse code modulation (RDPCM). In some examples, residual generation unit 204 may be formed using one or more subtractor circuits that perform binary subtraction.

In examples where mode selection unit 202 partitions CUs into PUs, each PU may be associated with a luma prediction unit and corresponding chroma prediction units. Video encoder 200 and video decoder 300 may support PUs having various sizes. As indicated above, the size of a CU may refer to the size of the luma coding block of the CU and the size of a PU may refer to the size of a luma prediction unit of the PU. Assuming that the size of a particular CU is 2N×2N, video encoder 200 may support PU sizes of 2N×2N or N×N for intra prediction, and symmetric PU sizes of 2N×2N, 2N×N, N×2N, N×N, or similar for inter prediction. Video encoder 200 and video decoder 300 may also support asymmetric partitioning for PU sizes of 2N×nU, 2N×nD, nL×2N, and nR×2N for inter prediction.

In examples where mode selection unit 202 does not further partition a CU into PUs, each CU may be associated with a luma coding block and corresponding chroma coding blocks. As above, the size of a CU may refer to the size of the luma coding block of the CU. The video encoder 200 and video decoder 300 may support CU sizes of 2N×2N, 2N×N, or N×2N.

For other video coding techniques such as an intra-block copy mode coding, an affine-mode coding, and linear model (LM) mode coding, as few examples, mode selection unit 202, via respective units associated with the coding techniques, generates a prediction block for the current block being encoded. In some examples, such as palette mode coding, mode selection unit 202 may not generate a prediction block, and instead generate syntax elements that indicate the manner in which to reconstruct the block based on a selected palette. In such modes, mode selection unit 202 may provide these syntax elements to entropy encoding unit 220 to be encoded.

As described above, residual generation unit 204 receives the video data for the current block and the corresponding prediction block. Residual generation unit 204 then generates a residual block for the current block. To generate the residual block, residual generation unit 204 calculates sample-by-sample differences between the prediction block and the current block.

Transform processing unit 206 applies one or more transforms to the residual block to generate a block of transform coefficients (referred to herein as a "transform coefficient block"). Transform processing unit 206 may apply various transforms to a residual block to form the transform coefficient block. For example, transform processing unit 206 may apply a discrete cosine transform (DCT), a directional transform, a Karhunen-Loeve transform (KLT), or a conceptually similar transform to a residual block. In some examples, transform processing unit 206 may perform multiple transforms to a residual block, e.g., a primary transform and a secondary transform, such as a rotational transform. In some examples, transform processing unit 206 does not apply transforms to a residual block.

Quantization unit 208 may quantize the transform coefficients in a transform coefficient block, to produce a quantized transform coefficient block. Quantization unit 208 may quantize transform coefficients of a transform coefficient block according to a quantization parameter (QP) value associated with the current block. Video encoder 200 (e.g., via mode selection unit 202) may adjust the degree of quantization applied to the coefficient blocks associated with the current block by adjusting the QP value associated with the CU. Quantization may introduce loss of information, and thus, quantized transform coefficients may have lower precision than the original transform coefficients produced by transform processing unit 206.

Inverse quantization unit 210 and inverse transform processing unit 212 may apply inverse quantization and inverse transforms to a quantized transform coefficient block, respectively, to reconstruct a residual block from the transform coefficient block. Reconstruction unit 214 may produce a reconstructed block corresponding to the current block (albeit potentially with some degree of distortion) based on the reconstructed residual block and a prediction block generated by mode selection unit 202. For example, reconstruction unit 214 may add samples of the reconstructed residual block to corresponding samples from the prediction block generated by mode selection unit 202 to produce the reconstructed block.

Filter unit 216 may perform one or more filter operations on reconstructed blocks. For example, filter unit 216 may perform deblocking operations to reduce blockiness artifacts along edges of CUs, or perform adaptive loop filtering (ALF). Operations of filter unit 216 may be skipped, in some examples.

Video encoder 200 stores reconstructed blocks in DPB 218. For instance, in examples where operations of filter unit 216 are not needed, reconstruction unit 214 may store reconstructed blocks to DPB 218. In examples where operations of filter unit 216 are needed, filter unit 216 may store the filtered reconstructed blocks to DPB 218. Motion estimation unit 222 and motion compensation unit 224 may retrieve a reference picture from DPB 218, formed from the reconstructed (and potentially filtered) blocks, to inter-predict blocks of subsequently encoded pictures. In addition, intra-prediction unit 226 may use reconstructed blocks in DPB 218 of a current picture to intra-predict other blocks in the current picture.

In general, entropy encoding unit 220 may entropy encode syntax elements received from other functional components of video encoder 200. For example, entropy encoding unit 220 may entropy encode quantized transform coefficient blocks from quantization unit 208. As another example, entropy encoding unit 220 may entropy encode prediction syntax elements (e.g., motion information for inter-prediction or intra-mode information for intra-prediction) from mode selection unit 202. Entropy encoding unit 220 may perform one or more entropy encoding operations on the syntax elements, which are another example of video data, to generate entropy-encoded data. For example, entropy encoding unit 220 may perform a context-adaptive variable length coding (CAVLC) operation, a CABAC operation, a variable-to-variable (V2V) length coding operation, a syntax-based context-adaptive binary arithmetic coding (SBAC) operation, a Probability Interval Partitioning Entropy (PIPE) coding operation, an Exponential-Golomb encoding operation, or another type of entropy encoding operation on the data. In some examples, entropy encoding unit 220 may operate in bypass mode where syntax elements are not entropy encoded.

Video encoder 200 may output a bitstream that includes the entropy encoded syntax elements needed to reconstruct blocks of a slice or picture. In particular, entropy encoding unit 220 may output the bitstream.

The operations described above are described with respect to a block. Such description should be understood as being operations for a luma coding block and/or chroma coding blocks. As described above, in some examples, the luma coding block and chroma coding blocks are luma and chroma components of a CU. In some examples, the luma coding block and the chroma coding blocks are luma and chroma components of a PU.

In some examples, operations performed with respect to a luma coding block need not be repeated for the chroma coding blocks. As one example, operations to identify a motion vector (MV) and reference picture for a luma coding block need not be repeated for identifying a MV and reference picture for the chroma blocks. Rather, the MV for the luma coding block may be scaled to determine the MV for the chroma blocks, and the reference picture may be the same. As another example, the intra-prediction process may be the same for the luma coding blocks and the chroma coding blocks.

Video encoder 200 represents an example of a device configured to encode video data including a memory configured to store video data, and one or more processing units implemented in circuitry (e.g., at least one of fixed-function and programmable circuitry). Video encoder 200 may be configured to determine which filter set video decoder 300 is to use for adaptive loop filtering a block and signal information used by video decoder 300 to determine the filter set to use for adaptive loop filtering utilizing one or more example techniques described in this disclosure.

For example, mode selection unit 202 and filter unit 216 may together perform the example techniques described in this disclosure for performing adaptive loop filtering. As one example, mode selection unit 202 may determine adaptive filters for slices, pictures, or group of pictures based on the video content in the slices, pictures, or group of picture. Mode selection unit 202 may include the adaptive filters in one or more parameter sets (e.g., APSs) for storage in memory 230. For example, memory 230 (or some other memory) may store parameter sets (e.g., APSs), which each include one or more adaptive filters for adaptive loop filtering. Memory 230 (or some other memory) may also store fixed filters used for adaptive loop filtering.

For a current coding structure (e.g., current slice, picture, tile, tile group, or brick) of the video data, mode selection unit 202 may determine a number of parameter sets (e.g., APSs) that the current coding structure refers to for adaptive loop filtering. Mode selection unit 202 may then cause entropy encoding unit 220 to encode the information of the number of parameter sets that the current coding structure refers to for adaptive loop filtering.

The current coding structure may include a current block of the video data (e.g., luma CTB), for which adaptive loop filtering is enabled (e.g., as determined by mode selection unit 202). If mode selection unit 202 determines that the number of the parameter sets for the current coding structure refers to for adaptive loop filtering is equal to zero, mode selection unit 202 may determine which fixed filter from a set of fixed filters to use for adaptive loop filtering. In one or more examples, mode selection unit 202 may bypass signaling of a syntax element that indicates whether one of the set of fixed filters is to be used for adaptive loop filtering. That is, rather than signaling the syntax element that indicates whether one of the set of fixed filters is to be used for adaptive loop filtering, mode selection unit 202 may not signal such syntax elements (e.g., mode selection unit 202 may bypass signaling of used_fixed_filter, which is same as bypass the signaling of alf_use_aps_flag).

Filter unit 216 may perform adaptive loop filtering based on the determined fixed filter. Filter unit 216 may store the resulting filtered block in decoded picture buffer 218.

In the above example, the number of the parameter sets for the current coding structure refers to for adaptive loop filtering is equal to zero. However, in some cases, the number of the parameter sets for the current coding structure refers to for adaptive loop filtering is greater than zero. For example, assume in the above example that the current coding structure is a first coding structure and the current block is a first block. Mode selection unit 202 may determine that a number of the parameter sets that a second coding structure that includes a second block, for which adaptive loop filtering is enabled, refers to for adaptive loop filtering is greater than zero. In this example, mode selection unit 202 may signal the syntax element (e.g., used_fixed_filter) that indicates whether one of the set of fixed filters is to be used for adaptive loop filtering. Based on the number of the parameter sets that the second coding structure refers to for adaptive loop filtering being greater than zero and the syntax element indicating that one of the set of fixed filters is not to be used, mode selection unit 202 may determine which one of the parameter sets includes an adaptive filter to be used for performing adaptive loop filtering on the second block. Filter unit 216 may perform adaptive loop filtering on the second block based on the adaptive filter in the determined one of the parameter sets.

For the first block, mode selection unit 202 may signal an index into the set of fixed filters that identifies which fixed filter to use for adaptive loop filtering. For the second block, mode selection unit 202 may signal information indicative of which one of the parameter sets includes the adaptive filter to be used for performing adaptive loop filtering on the second block.

Figure 4:
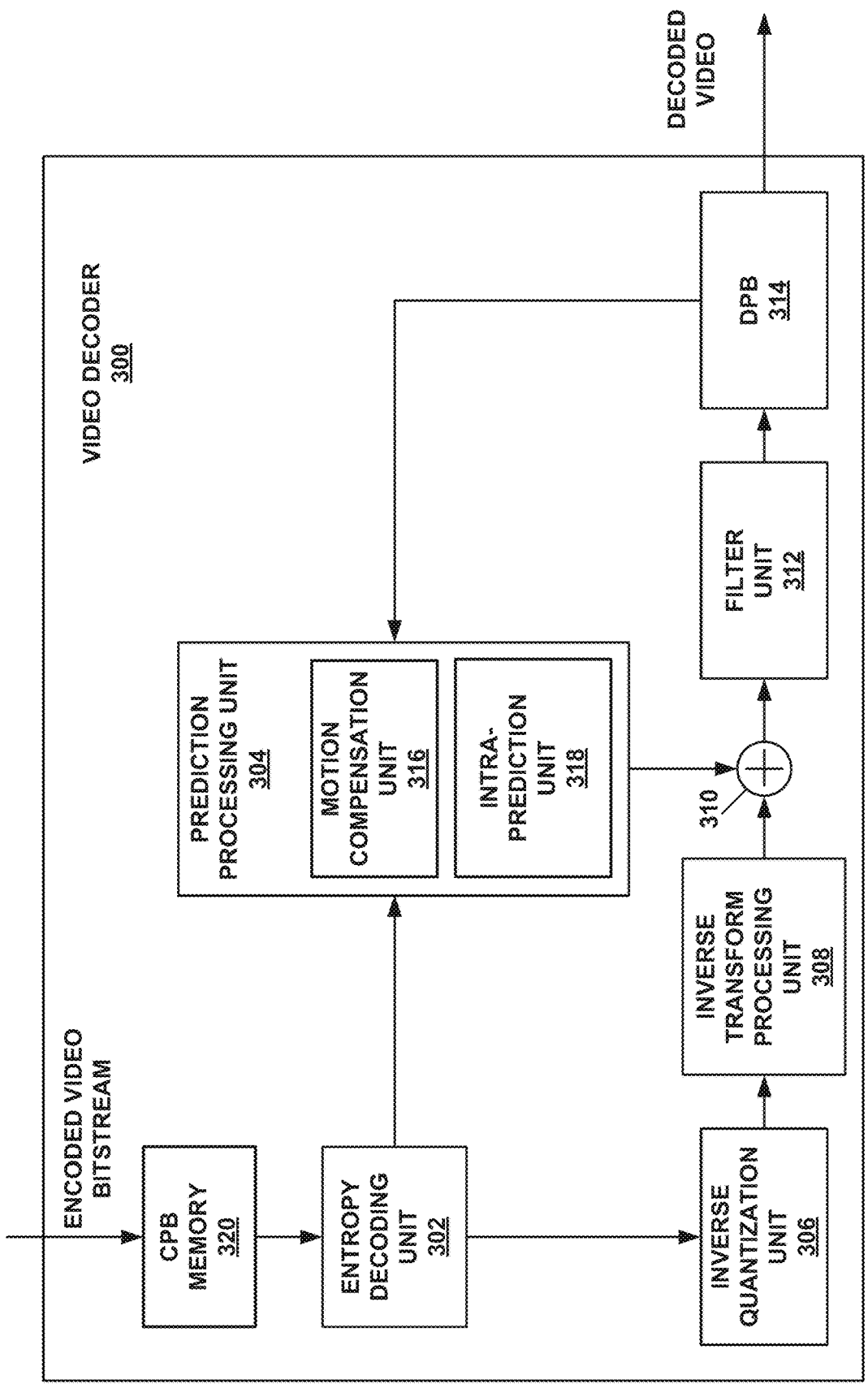
FIG. 4 is a block diagram illustrating an example video decoder that may perform the techniques of this disclosure.

FIG. 4 is a block diagram illustrating an example video decoder 300 that may perform the techniques of this disclosure. FIG. 4 is provided for purposes of explanation and is not limiting on the techniques as broadly exemplified and described in this disclosure. For purposes of explanation, this disclosure describes video decoder 300 is described according to the techniques of VVC and HEVC. However, the techniques of this disclosure may be performed by video coding devices that are configured to other video coding standards.

In the example of FIG. 4, video decoder 300 includes coded picture buffer (CPB) memory 320, entropy decoding unit 302, prediction processing unit 304, inverse quantization unit 306, inverse transform processing unit 308, reconstruction unit 310, filter unit 312, and decoded picture buffer (DPB) 314. Any or all of CPB memory 320, entropy decoding unit 302, prediction processing unit 304, inverse quantization unit 306, inverse transform processing unit 308, reconstruction unit 310, filter unit 312, and DPB 314 may be implemented in one or more processors or in processing circuitry. Moreover, video decoder 300 may include additional or alternative processors or processing circuitry to perform these and other functions.

Prediction processing unit 304 includes motion compensation unit 316 and intra-prediction unit 318. Prediction processing unit 304 may include addition units to perform prediction in accordance with other prediction modes. As examples, prediction processing unit 304 may include a palette unit, an intra-block copy unit (which may form part of motion compensation unit 316), an affine unit, a linear model (LM) unit, or the like. In other examples, video decoder 300 may include more, fewer, or different functional components.

CPB memory 320 may store video data, such as an encoded video bitstream, to be decoded by the components of video decoder 300. The video data stored in CPB memory 320 may be obtained, for example, from computer-readable medium 110 (FIG. 1). CPB memory 320 may include a CPB that stores encoded video data (e.g., syntax elements) from an encoded video bitstream. Also, CPB memory 320 may store video data other than syntax elements of a coded picture, such as temporary data representing outputs from the various units of video decoder 300. DPB 314 generally stores decoded pictures, which video decoder 300 may output and/or use as reference video data when decoding subsequent data or pictures of the encoded video bitstream. CPB memory 320 and DPB 314 may be formed by any of a variety of memory devices, such as dynamic random access memory (DRAM), including synchronous DRAM (SDRAM), magnetoresistive RAM (MRAM), resistive RAM (RRAM), or other types of memory devices. CPB memory 320 and DPB 314 may be provided by the same memory device or separate memory devices. In various examples, CPB memory 320 may be on-chip with other components of video decoder 300, or off-chip relative to those components.

Additionally or alternatively, in some examples, video decoder 300 may retrieve coded video data from memory 120 (FIG. 1). That is, memory 120 may store data as discussed above with CPB memory 320. Likewise, memory 120 may store instructions to be executed by video decoder 300, when some or all of the functionality of video decoder 300 is implemented in software to executed by processing circuitry of video decoder 300.

The various units shown in FIG. 4 are illustrated to assist with understanding the operations performed by video decoder 300. The units may be implemented as fixed-function circuits, programmable circuits, or a combination thereof. Similar to FIG. 3, fixed-function circuits refer to circuits that provide particular functionality, and are preset on the operations that can be performed. Programmable circuits refer to circuits that can programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, the one or more of the units may be distinct circuit blocks (fixed-function or programmable), and in some examples, the one or more units may be integrated circuits.

Video decoder 300 may include ALUs, EFUs, digital circuits, analog circuits, and/or programmable cores formed from programmable circuits. In examples where the operations of video decoder 300 are performed by software executing on the programmable circuits, on-chip or off-chip memory may store instructions (e.g., object code) of the software that video decoder 300 receives and executes.

Entropy decoding unit 302 may receive encoded video data from the CPB and entropy decode the video data to reproduce syntax elements. Prediction processing unit 304, inverse quantization unit 306, inverse transform processing unit 308, reconstruction unit 310, and filter unit 312 may generate decoded video data based on the syntax elements extracted from the bitstream.

In general, video decoder 300 reconstructs a picture on a block-by-block basis. Video decoder 300 may perform a reconstruction operation on each block individually (where the block currently being reconstructed, i.e., decoded, may be referred to as a "current block").

Entropy decoding unit 302 may entropy decode syntax elements defining quantized transform coefficients of a quantized transform coefficient block, as well as transform information, such as a quantization parameter (QP) and/or transform mode indication(s). Inverse quantization unit 306 may use the QP associated with the quantized transform coefficient block to determine a degree of quantization and, likewise, a degree of inverse quantization for inverse quantization unit 306 to apply. Inverse quantization unit 306 may, for example, perform a bitwise left-shift operation to inverse quantize the quantized transform coefficients. Inverse quantization unit 306 may thereby form a transform coefficient block including transform coefficients.

After inverse quantization unit 306 forms the transform coefficient block, inverse transform processing unit 308 may apply one or more inverse transforms to the transform coefficient block to generate a residual block associated with the current block. For example, inverse transform processing unit 308 may apply an inverse DCT, an inverse integer transform, an inverse Karhunen-Loeve transform (KLT), an inverse rotational transform, an inverse directional transform, or another inverse transform to the coefficient block.

Furthermore, prediction processing unit 304 generates a prediction block according to prediction information syntax elements that were entropy decoded by entropy decoding unit 302. For example, if the prediction information syntax elements indicate that the current block is inter-predicted, motion compensation unit 316 may generate the prediction block. In this case, the prediction information syntax elements may indicate a reference picture in DPB 314 from which to retrieve a reference block, as well as a motion vector identifying a location of the reference block in the reference picture relative to the location of the current block in the current picture. Motion compensation unit 316 may generally perform the inter-prediction process in a manner that is substantially similar to that described with respect to motion compensation unit 224 (FIG. 3).

As another example, if the prediction information syntax elements indicate that the current block is intra-predicted, intra-prediction unit 318 may generate the prediction block according to an intra-prediction mode indicated by the prediction information syntax elements. Again, intra-prediction unit 318 may generally perform the intra-prediction process in a manner that is substantially similar to that described with respect to intra-prediction unit 226 (FIG. 3). Intra-prediction unit 318 may retrieve data of neighboring samples to the current block from DPB 314.

Reconstruction unit 310 may reconstruct the current block using the prediction block and the residual block. For example, reconstruction unit 310 may add samples of the residual block to corresponding samples of the prediction block to reconstruct the current block.

Filter unit 312 may perform one or more filter operations on reconstructed blocks. For example, filter unit 312 may perform deblocking operations to reduce blockiness artifacts along edges of the reconstructed blocks, and/or operations of adaptive loop filtering. Operations of filter unit 312 are not necessarily performed in all examples.

Video decoder 300 may store the reconstructed blocks in DPB 314. As discussed above, DPB 314 may provide reference information, such as samples of a current picture for intra-prediction and previously decoded pictures for subsequent motion compensation, to prediction processing unit 304. Moreover, video decoder 300 may output decoded pictures from DPB for subsequent presentation on a display device, such as display device 118 of FIG. 1.

In this manner, video decoder 300 represents an example of a video decoding device including a memory configured to store video data, and one or more processing units implemented in circuitry (e.g., at least one of fixed-function and programmable circuitry). Video decoder 300 may be configured to determine which filter set to use for adaptive loop filtering based on information signaled or derived utilizing one or more example techniques described in this disclosure and perform adaptive loop filtering on a block utilizing the determined filter set.

For example, prediction processing unit 304 and filter unit 312 may together perform the example techniques described in this disclosure for performing adaptive loop filtering. As one example, memory of video decoder 300 (e.g., CPB memory 320, DPB 314, or some other memory) may store parameter sets (e.g., APSs), which each include one or more adaptive filters for adaptive loop filtering. For instance, video encoder 200 may have signaled the adaptive filters in the APSs that prediction processing unit 304 stores in the memory for video decoder 300.

Prediction processing unit 304 may receive information indicative of the number of parameter sets the current coding structure (e.g., current slice, picture, tile, tile group, or brick) refers to for adaptive loop filtering. In some examples, prediction processing unit 304 may determine that a number of parameter sets (e.g., APSs) that a current coding structure (e.g., current slice, picture, tile, tile group, or brick) refers to for adaptive loop filtering is equal to zero. The current coding structure may include a current block for which adaptive loop filtering is enabled. One example of the current block is a luma coding tree block (CTB).

Based on the number of the parameter sets that the current coding structure refers to for adaptive loop filtering being equal to zero, prediction processing unit 304 may determine which fixed filter from a set of fixed filters to use for adaptive loop filtering without receiving a syntax element that indicates whether one of the set of fixed filters is to be used for adaptive loop filtering. For example, prediction processing unit 304 may not need to receive one or more syntax elements, such as use_fixed_filter (or alf_use_aps_flag if the complement logic of use_fixed_filter is used) to determine that a fixed filter is to be used for adaptive loop filtering the current block. In other words, prediction processing unit 304 may be configured to determine (e.g., infer) that a flag (e.g., use_fixed_filter or alf_use_aps_flag), which indicates whether one of the fixed filters or one of the adaptive filters from a parameter set is to be used for performing adaptive loop filtering, indicates that one of the fixed filters is to be used for performing adaptive loop filtering.

To determine which fixed filter from the set of fixed filters to use for adaptive loop filtering without receiving a syntax element that indicates whether one of the set of fixed filters is to be used for adaptive loop filtering, prediction processing unit 304 may receive an index into the set of fixed filters that identifies which fixed filter to use for adaptive loop filtering. Prediction processing unit 304 may then determine which filter to use based on the index.

Filter unit 312 may then perform adaptive loop filtering on the current block based on the fixed filter form the set of fixed filters. Filter unit 312 may output the filtered block to DPB 314 for storage for use for inter-predicting a subsequent block and/or for eventual outputting for display.

The above describes an example where N=0 (e.g., a number of the parameter sets that a current coding structure, such as current slice, that includes a current block, for which adaptive loop filtering is enabled, refers to for adaptive loop filtering is equal to zero). However, in some cases, N is greater than 0. In such examples, video decoder 300 may receive a syntax element that indicates whether one of a set of fixed filters is to be used for adaptive loop filtering (e.g., video decoder 300 may receive use_fixed_filter).

In the above example, the number of the parameter sets the current coding structure (e.g., current slice, picture, tile, tile group, or brick) refers to for adaptive loop filtering is equal to zero. However, in some cases, the number of the parameter sets the current coding structure refers to for adaptive loop filtering is greater than zero. For example, assume in the above example that the current coding structure is a first coding structure and the current block is a first block. Prediction processing unit 304 may determine that a number of the parameter sets that a second coding structure that includes a second block, for which adaptive loop filtering is enabled, refers to for adaptive loop filtering is greater than zero. In this example, prediction processing unit 304 may receive the syntax element (e.g., used_fixed_filter) that indicates whether one of the set of fixed filters is to be used for adaptive loop filtering. Based on the number of the parameter sets that the second coding structure refers to for adaptive loop filtering being greater than zero and the syntax element indicating that one of the set of fixed filters is not to be used, prediction processing unit 304 may determine which one of the parameter sets includes an adaptive filter to be used for performing adaptive loop filtering on the second block. Filter unit 312 may perform adaptive loop filtering on the second block based on the adaptive filter in the determined one of the parameter sets.

For the first block, prediction processing unit 304 may receive an index into the set of fixed filters that identifies which fixed filter to use for adaptive loop filtering. For the second block, prediction processing unit 304 may receive information indicative of which one of the parameter sets includes the adaptive filter to be used for performing adaptive loop filtering on the second block.

Figure 5:
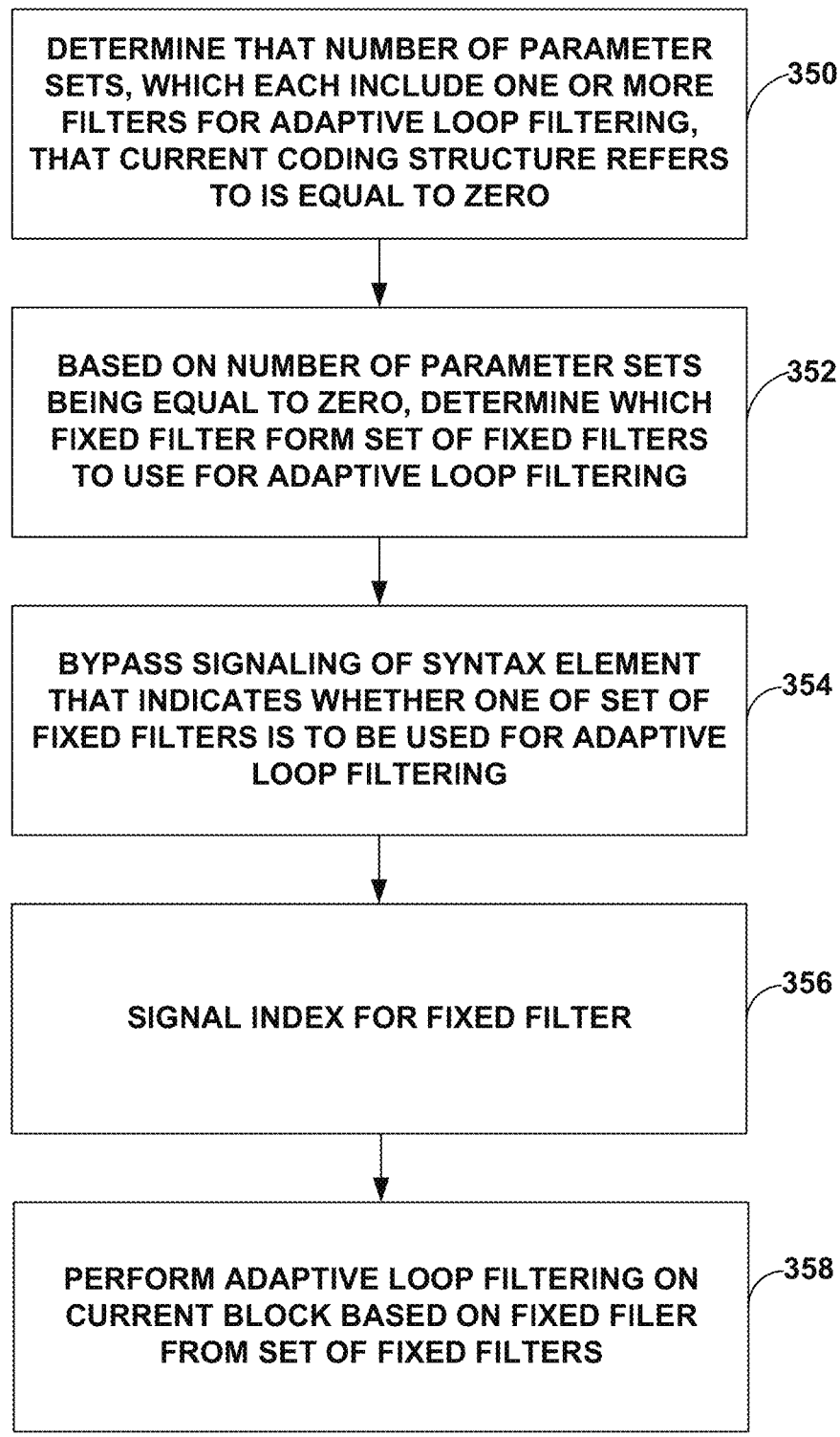
FIG. 5 is a flowchart illustrating an example method of encoding video data.

FIG. 5 is a flowchart illustrating an example method for encoding a current block. Although described with respect to video encoder 200 (FIGS. 1 and 3), it should be understood that other devices may be configured to perform a method similar to that of FIG. 5. For instance, the example of FIG. 5 is described with respect to processing circuitry (e.g., fixed-function and/or programmable circuitry). Examples of the processing circuitry include video encoder 200. In the example of FIG. 5, a memory (e.g. memory 230 or some other memory) may be configured to store parameter sets (e.g., APSs), which each include one or more adaptive filters for adaptive loop filtering.

The processing circuitry of video encoder 200 may determine that a number of the parameter sets that a current coding structure (e.g., current slice, picture, tile, tile group, or brick) of the video data refers to for adaptive loop filtering is equal to zero (e.g., N=0, slice_num_alf_aps_ids=0, or, or ph_num_alf_aps_ids=0) (350). The current coding structure (e.g., current slice, picture, tile, tile group, or brick) includes a current block of the video data (e.g., luma CTB), for which adaptive loop filtering is enabled. The processing circuitry may signal information indicative of the number of the parameter sets that the current coding structure refers to for adaptive loop filtering (e.g., in a slice header or some other higher level syntax structure).

Based on the number of the parameter sets that the current coding structure refers to for adaptive loop filtering being equal to zero, the processing circuitry of video encoder 200 may determine which fixed filter from a set of fixed filters to use for adaptive loop filtering (352). For instance, because the current coding structure does not refer to any of the APSs, the current block cannot be filtered using adaptive filters since adaptive filters are in the APSs. Therefore, the processing circuitry may determine which fixed filter to use. The processing circuitry may signal an index into the set of fixed filters that identifies which fixed filter to use for adaptive loop filtering.

The processing circuitry may bypass signaling of the syntax element (e.g., use_fixed_filter or alf_use_aps_flag) that indicates whether one of the set of fixed filters is to be used for adaptive loop filtering (354). For instance, because the current coding structure does not refer to any of the APSs, then fixed filters may be the only source for the filters for adaptive loop filtering. Accordingly, signaling the use_fixed_filter may not serve any purpose and instead waste bandwidth and computation resources.

In some examples, the processing circuitry may signal an index into the set of fixed filters that identifies which fixed filter to use for adaptive loop filtering (356). In this way, video decoder 300 may know which fixed filter to use.

The processing circuitry may perform adaptive loop filtering on the current block based on the fixed filter from the set of fixed filters (358). The result is a filtered block that is stored for inter-predicting a subsequent block.

In the above example, the number of the parameter sets that the current coding structure refers to for adaptive loop filtering is equal to zero. However, in some examples, number of the parameter sets that a coding structure refers to for adaptive loop filtering is greater than zero.

For instance, in the above example, the current coding structure is a first coding structure and the current block is a first block. In some examples, the processing circuitry of video encoder 200 may determine that a number of the parameter sets that a second coding structure that includes a second block, for which adaptive loop filtering is enabled, refers to for adaptive loop filtering is greater than zero. In this example, the processing circuitry of video encoder 200 may signal the syntax element that indicates whether one of the set of fixed filters is to be used for adaptive loop filtering. Based on the number of the parameter sets that the second coding structure (e.g., slice, picture, tile, tile group, or brick) refers to for adaptive loop filtering being greater than zero and the syntax element indicating that one of the set of fixed filters is not to be used, the processing circuitry of video encoder 200 may determine which one of the parameter sets includes an adaptive filter to be used for performing adaptive loop filtering on the second block. The processing circuitry of video encoder 200 may perform adaptive loop filtering on the second block based on the adaptive filter in the determined one of the parameter sets. In one or more examples, the processing circuitry of video encoder 200 may signal information indicative of which one of the parameter sets includes the adaptive filter to be used for performing adaptive loop filtering on the second block.

Figure 6:
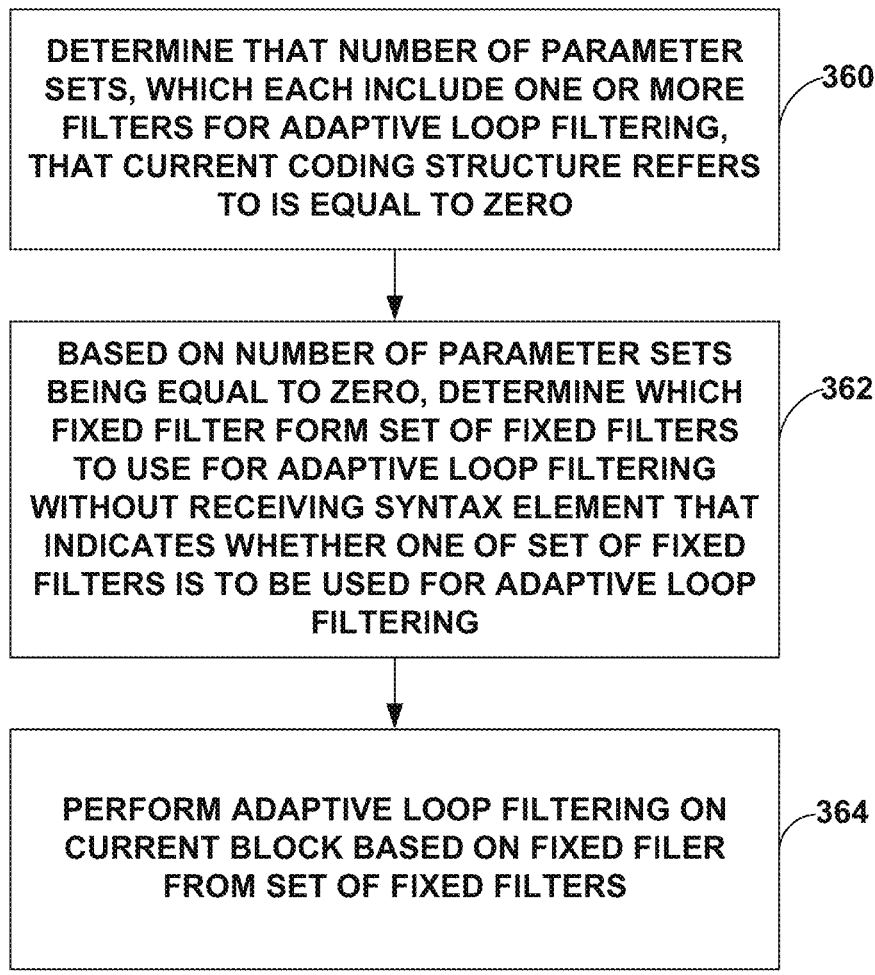
FIG. 6 is a flowchart illustrating an example method of decoding video data.

FIG. 6 is a flowchart illustrating an example method for decoding a current block of video data. Although described with respect to video decoder 300 (FIGS. 1 and 4), it should be understood that other devices may be configured to perform a method similar to that of FIG. 6. For instance, the example of FIG. 6 is described with respect to processing circuitry (e.g., fixed-function and/or programmable circuitry). Examples of the processing circuitry include video decoder 300. In the example of FIG. 6, a memory (e.g. memory 320, DPB 314, or some other memory) may be configured to store parameter sets (e.g., APSs), which each include one or more adaptive filters for adaptive loop filtering. The parameter sets may be received in the signaling from video encoder 200.

The processing circuitry of video decoder 300 may determine that a number of the parameter sets that a current coding structure (e.g., current slice, picture, tile, tile group, or brick) of the video data refers to for adaptive loop filtering is equal to zero (e.g., N=0, slice_num_alf_aps_ids=0, or, or ph_num_alf_aps_ids=0) (360). The current coding structure (e.g., current slice, picture, tile, tile group, or brick) includes a current block of the video data (e.g., luma CTB), for which adaptive loop filtering is enabled. The processing circuitry of video decoder 300 may receive, from video encoder 200, information indicative of the number of the parameter sets that the current coding structure refers to for adaptive loop filtering (e.g., in a slice header or some other higher level syntax structure). The processing circuitry of video decoder 300 may determine that the number of the parameter sets that the current coding structure refers to for adaptive loop filtering is equal to zero based on the received information.

Based on the number of the parameter sets that the current coding structure refers to for adaptive loop filtering being equal to zero, the processing circuitry of video decoder 300 may determine which fixed filter from a set of fixed filters to use for adaptive loop filtering without receiving a syntax element that indicates whether one of the set of fixed filters is to be used for adaptive loop filtering (362). For example, because the current coding structure does not refer to any of the APSs (e.g., because N=0), the current block cannot be filtered using adaptive filters since adaptive filters are in the APSs. Therefore, the processing circuitry may determine which fixed filter to use without receiving a syntax element (e.g., use_fixed_filter or alf_use_aps_flag) that indicates whether one of the set of fixed filters is to be used for adaptive loop filtering.

In some examples, to determine which fixed filter from the set of fixed filters to use for adaptive loop filtering without receiving a syntax element that indicates whether one of the set of fixed filters is to be used for adaptive loop filtering, the processing circuitry of video decoder 300 may determine (e.g., infer) that a flag (e.g., use_fixed_filter or alf_use_aps_flag), which indicates whether one of the fixed filters or one of the adaptive filters from a parameter set is to be used for performing adaptive loop filtering, indicates that one of the fixed filters is to be used for performing adaptive loop filtering. In such examples, the processing circuitry of video decoder 300 may receive an index into the set of fixed filters that identifies which fixed filter to use for adaptive loop filtering.

The processing circuitry of video decoder 300 may perform adaptive loop filtering on the current block based on the fixed filter identified by the index from the set of fixed filters (364). The result is a filtered block that is stored for inter-predicting a subsequent block and/or for output for display.

In the above example, the number of the parameter sets that the current coding structure refers to for adaptive loop filtering is equal to zero. However, in some examples, the number of the parameter sets that a coding structure refers to for adaptive loop filtering is greater than zero.

For instance, in the above example, the current coding structure is a first coding structure and the current block is a first block. In some examples, the processing circuitry of video decoder 300 may determine that a number of the parameter sets that a second coding structure that includes a second block, for which adaptive loop filtering is enabled, refers to for adaptive loop filtering is greater than zero. In such examples, the processing circuitry of video decoder 300 may receive the syntax element (e.g., use_fixed_filter or alf_use_aps_flag) that indicates whether one of the set of fixed filters is to be used for adaptive loop filtering. Based on the number of the parameter sets that the second coding structure refers to for adaptive loop filtering being greater than zero and the syntax element indicating that one of the set of fixed filters is not to be used, the processing circuitry of video decoder 300 may determine which one of the parameter sets includes an adaptive filter to be used for performing adaptive loop filtering on the second block. The processing circuitry of video decoder 300 may perform adaptive loop filtering on the second block based on the adaptive filter in the determined one of the parameter sets. In some examples, to determine which one of the parameter sets includes the adaptive filter to be used for performing adaptive loop filtering on the second block, the processing circuitry of video decoder 300 may receive information indicative of which one of the parameter sets includes the adaptive filter to be used for performing adaptive loop filtering on the second block.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of decoding video data, the method comprising:
   determining that a number of parameter sets, which each include one or more adaptive filters for adaptive loop filtering, that a current coding structure of the video data refers to for adaptive loop filtering is equal to zero, wherein the current coding structure includes a current block of the video data for which adaptive loop filtering is enabled, and wherein the current coding structure comprises one of a current slice, picture, tile, tile group, or brick;
   based on the number of the parameter sets that the current coding structure refers to for adaptive loop filtering being equal to zero, determining which fixed filter to use for adaptive loop filtering without receiving a syntax element that specifies whether fixed filter based adaptive loop filtering is to be used; and
   performing adaptive loop filtering on the current block based on the fixed filter.

2. The method of claim 1, wherein the parameter sets include adaptation parameter sets (APSs).

3. The method of claim 1, wherein determining which fixed filter to use for adaptive loop filtering without receiving the syntax element that specifies whether fixed filter based adaptive loop filtering is to be used comprises determining that a flag, which specifies whether one of fixed filters or one of the adaptive filters from a parameter set is to be used for performing adaptive loop filtering, specifies that fixed filter based adaptive loop filtering is to be used.

4. The method of claim 1, wherein the current coding structure is a first coding structure and the current block is a first block, the method further comprising:
   determining that a number of the parameter sets that a second coding structure that includes a second block, for which adaptive loop filtering is enabled, refers to for adaptive loop filtering is greater than zero;
   receiving the syntax element that specifies whether fixed filter based adaptive loop filtering is to be used;
   based on the number of the parameter sets that the second coding structure refers to for adaptive loop filtering being greater than zero and the syntax element specifying that fixed filter based adaptive loop filtering is not to be used, determining which one of the parameter sets includes an adaptive filter to be used for performing adaptive loop filtering on the second block; and performing adaptive loop filtering on the second block based on the adaptive filter in the determined one of the parameter sets.

5. The method of claim 4, wherein determining which one of the parameter sets includes the adaptive filter to be used for performing adaptive loop filtering on the second block comprises receiving information indicative of which one of the parameter sets includes the adaptive filter to be used for performing adaptive loop filtering on the second block.

6. The method of claim 1, wherein the current block is a luma coding tree block (CTB).

7. The method of claim 1, wherein determining which fixed filter to use for adaptive loop filtering without receiving the syntax element that specifies whether fixed filter based adaptive loop filtering is to be used comprises receiving an index into a set of fixed filters that identifies which fixed filter to use for adaptive loop filtering.

8. The method of claim 1, further comprising receiving information indicative of the number of the parameter sets the current coding structure refers to for adaptive loop filtering.

9. A device for decoding video data, the device comprising:
a memory configured to store parameter sets, which each include one or more adaptive filters for adaptive loop filtering; and
processing circuitry, wherein the processing circuitry is configured to:
determine that a number of the parameter sets that a current coding structure of the video data refers to for adaptive loop filtering is equal to zero, wherein the current coding structure includes a current block of the video data for which adaptive loop filtering is enabled, and wherein the current coding structure comprises one of a current slice, picture, tile, tile group, or brick;
based on the number of the parameter sets that the current coding structure refers to for adaptive loop filtering being equal to zero, determine which fixed filter to use for adaptive loop filtering without receiving a syntax element that specifies whether fixed filter based adaptive loop filtering is to be used; and
perform adaptive loop filtering on the current block based on the fixed filter.

10. The device of claim 9, wherein the parameter sets include adaptation parameter sets (APSs).

11. The device of claim 9, wherein to determine which fixed filter to use for adaptive loop filtering without receiving the syntax element that specifies whether fixed filter based adaptive loop filtering is to be used, the processing circuitry is configured to determine that a flag, which specifies whether one of fixed filters or one of the adaptive filters from a parameter set is to be used for performing adaptive loop filtering, specifies that fixed filter based adaptive loop filtering is to be used.

12. The device of claim 9, wherein the current coding structure is a first coding structure and the current block is a first block, and the processing circuitry is configured to:
determine that a number of the parameter sets that a second coding structure that includes a second block, for which adaptive loop filtering is enabled, refers to for adaptive loop filtering is greater than zero;
receive the syntax element that specifies whether fixed filter based adaptive loop filtering is to be used;
based on the number of the parameter sets that the second coding structure refers to for adaptive loop filtering being greater than zero and the syntax element specifying that fixed filter based adaptive loop filtering is not to be used, determine which one of the parameter sets includes an adaptive filter to be used for performing adaptive loop filtering on the second block; and
perform adaptive loop filtering on the second block based on the adaptive filter in the determined one of the parameter sets.

13. The device of claim 12, wherein to determine which one of the parameter sets includes the adaptive filter to be used for performing adaptive loop filtering on the second block, the processing circuitry is configured to receive information indicative of which one of the parameter sets includes the adaptive filter to be used for performing adaptive loop filtering on the second block.

14. The device of claim 9, wherein the current block is a luma coding tree block (CTB).

15. The device of claim 9, wherein to determine which fixed filter to use for adaptive loop filtering without receiving the syntax element that specifies whether fixed filter based adaptive loop filtering is to be used, the processing circuitry is configured to receive an index into a set of fixed filters that identifies which fixed filter to use for adaptive loop filtering.

16. The device of claim 9, wherein the processing circuitry is configured to receive information indicative of the number of the parameter sets the current coding structure refers to for adaptive loop filtering.

17. The device of claim 9, wherein the device comprises one or more of a computer, a mobile device, a broadcast receiver device, or a set-top box.

18. A device for decoding video data, the device comprising:
means for determining that a number of parameter sets, which each include one or more adaptive filters for adaptive loop filtering, that a current coding structure of the video data refers to for adaptive loop filtering is equal to zero, wherein the current coding structure includes a current block of the video data for which adaptive loop filtering is enabled, and wherein the current coding structure comprises one of a current slice, picture, tile, tile group, or brick;
means for determining which fixed filter to use for adaptive loop filtering without receiving a syntax element that specifies whether fixed filter based adaptive loop filtering is to be used based on the number of the parameter sets that the current coding structure refers to for adaptive loop filtering being equal to zero; and
means for performing adaptive loop filtering on the current block based on the fixed filter.

19. The device of claim 18, wherein the parameter sets include adaptation parameter sets (APSs).

20. The device of claim 18, wherein the means for determining which fixed filter to use for adaptive loop filtering without receiving the syntax element that specifies whether fixed filter based adaptive loop filtering is to be used comprises means for determining that a flag, which specifies whether one of fixed filters or one of the adaptive filters from a parameter set is to be used for performing adaptive loop filtering, specifies that fixed filter based adaptive loop filtering is to be used.

21. A computer-readable storage medium storing instructions thereon that when executed cause one or more processors to:
determine that a number of parameter sets, which each include one or more adaptive filters for adaptive loop filtering, that a current coding structure of video data refers to for adaptive loop filtering is equal to zero, wherein the current coding structure includes a current block of the video data for which adaptive loop filtering is enabled, and wherein the current coding structure comprises one of a current slice, picture, tile, tile group, or brick;

determine which fixed filter to use for adaptive loop filtering without receiving a syntax element that specifies whether fixed filter based adaptive loop filtering is to be used based on the number of the parameter sets that the current coding structure refers to for adaptive loop filtering being equal to zero; and perform adaptive loop filtering on the current block based on the fixed filter.

22. The computer-readable storage medium of claim 21, wherein the parameter sets include adaptation parameter sets (APSs).

23. The computer-readable storage medium of claim 21, wherein the instructions that cause the one or more processors to determine which fixed filter to use for adaptive loop filtering without receiving the syntax element that specifies whether fixed filter based adaptive loop filtering is to be used comprise instructions that cause the one or more processors to determine that a flag, which specifies whether one of fixed filters or one of the adaptive filters from a parameter set is to be used for performing adaptive loop filtering, specifies that fixed filter based adaptive loop filtering is to be used.

24. A method of encoding video data, the method comprising:

determining that a number of parameter sets, which each include one or more adaptive filters for adaptive loop filtering, and which a current coding structure of the video data refers to for adaptive loop filtering, is equal to zero, wherein the current coding structure includes a current block of the video data for which adaptive loop filtering is enabled, and wherein the current coding structure comprises one of a current slice, picture, tile, tile group, or brick;

based on the number of the parameter sets that the current coding structure refers to for adaptive loop filtering being equal to zero, determining which fixed filter to use for adaptive loop filtering;

based on the number of the parameter sets that the current coding structure refers to for adaptive loop filtering being equal to zero, not signaling of a syntax element that specifies whether fixed filter based adaptive loop filtering is to be used; and performing adaptive loop filtering on the current block based on the fixed filter.

25. The method of claim 24, wherein the parameter sets include adaptation parameter sets (APSs).

26. The method of claim 24, wherein the current coding structure is a first coding structure and the current block is a first block, the method further comprising:

determining that a number of the parameter sets that a second coding structure that includes a second block, for which adaptive loop filtering is enabled, refers to for adaptive loop filtering is greater than zero; and signaling the syntax element that specifies whether fixed filter based adaptive loop filtering is to be used.

27. The method of claim 26, further comprising signaling information indicative of which one of the parameter sets includes the adaptive filter to be used for performing adaptive loop filtering on the second block.

28. The method of claim 24, wherein the current block is a luma coding tree block (CTB).

29. The method of claim 24, further comprising signaling an index that identifies which fixed filter to use for adaptive loop filtering.

30. The method of claim 24, further comprising signaling information indicative of the number of the parameter sets the current coding structure refers to for adaptive loop filtering.

31. A device for encoding video data, the device comprising:

a memory configured to store parameter sets, which each include one or more adaptive filters for adaptive loop filtering; and processing circuitry, wherein the processing circuitry is configured to:

determine that a number of the parameter sets that a current coding structure of the video data refers to for adaptive loop filtering is equal to zero, wherein the current coding structure includes a current block of video data, for which adaptive loop filtering is enabled;

based on the number of the parameter sets that the current coding structure refers to for adaptive loop filtering being equal to zero, determine which fixed filter to use for adaptive loop filtering;

based on the number of the parameter sets that the current coding structure refers to for adaptive loop filtering being equal to zero, not signaling of a syntax element that specifies whether fixed filter based adaptive loop filtering is to be used; and perform adaptive loop filtering on the current block based on the fixed filter.

32. The device of claim 31, wherein the parameter sets include adaptation parameter sets (APSs).

33. The device of claim 31, wherein the current coding structure is a first coding structure and the current block is a first block, and wherein the processing circuitry is configured to:

determine that a number of the parameter sets that a second coding structure that includes a second block, for which adaptive loop filtering is enabled, refers to for adaptive loop filtering is greater than zero; and signal the syntax element that specifies whether fixed filter based adaptive loop filtering is to be used.

34. The device of claim 33, wherein the processing circuitry is configured to signal information indicative of which one of the parameter sets includes the adaptive filter to be used for performing adaptive loop filtering on the second block.

35. The device of claim 31, wherein the current block is a luma coding tree block (CTB).

36. The device of claim 31, wherein the processing circuitry is configured to signal an index that identifies which fixed filter to use for adaptive loop filtering.

37. The device of claim 31, wherein the processing circuitry is configured to signal information indicative of the number of the parameter sets the current coding structure refers to for adaptive loop filtering.

* * * * *